United States Patent
Chudak et al.

(10) Patent No.: US 9,495,644 B2
(45) Date of Patent: Nov. 15, 2016

(54) SYSTEMS AND METHODS FOR IMPROVING THE PERFORMANCE OF A QUANTUM PROCESSOR BY REDUCING ERRORS

(71) Applicant: D-WAVE SYSTEMS INC., Burnaby (CA)

(72) Inventors: Fabian Ariel Chudak, Vancouver (CA); Christopher B. Rich, Vancouver (CA); Paul I. Bunyk, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 298 days.

(21) Appl. No.: 14/340,303

(22) Filed: Jul. 24, 2014

(65) Prior Publication Data

US 2015/0032994 A1    Jan. 29, 2015

Related U.S. Application Data

(60) Provisional application No. 61/858,011, filed on Jul. 24, 2013.

(51) Int. Cl.
*G06N 99/00* (2010.01)
*B82Y 10/00* (2011.01)

(52) U.S. Cl.
CPC ............. *G06N 99/002* (2013.01); *B82Y 10/00* (2013.01)

(58) Field of Classification Search
CPC ........................ G06N 99/002; B82Y 10/00
See application file for complete search history.

(56) References Cited

U.S. PATENT DOCUMENTS

| | | | |
|---|---|---|---|
| 7,135,701 B2 | 11/2006 | Amin et al. | |
| 7,418,283 B2 | 8/2008 | Amin | |
| 7,533,068 B2 | 5/2009 | Maassen van den Brink et al. | |
| 7,843,209 B2 | 11/2010 | Berkley | |
| 7,876,248 B2 | 1/2011 | Berkley et al. | |
| 8,008,942 B2 | 8/2011 | van den Brink et al. | |
| 8,035,540 B2 | 10/2011 | Berkley et al. | |
| 8,073,808 B2 | 12/2011 | Rose | |
| 8,098,179 B2 | 1/2012 | Bunyk et al. | |
| 8,169,231 B2 | 5/2012 | Berkley | |
| 8,174,305 B2 | 5/2012 | Harris | |
| 8,190,548 B2 | 5/2012 | Choi | |
| 8,195,596 B2 | 6/2012 | Rose et al. | |
| 8,421,053 B2 | 4/2013 | Bunyk et al. | |
| 2008/0052055 A1 | 2/2008 | Rose et al. | |
| 2008/0109500 A1* | 5/2008 | Macready | B82Y 10/00 708/2 |
| 2008/0313430 A1* | 12/2008 | Bunyk | B82Y 10/00 712/34 |
| 2011/0057169 A1 | 3/2011 | Harris et al. | |
| 2011/0238378 A1* | 9/2011 | Allen | B82Y 10/00 702/186 |

(Continued)

FOREIGN PATENT DOCUMENTS

WO    2012/064974 A2    5/2012

OTHER PUBLICATIONS

Amin, "Effect of Local Minima on Adiabatic Quantum Optimization," *Physical Review Letters* 100(130503):1-4, 2008.

(Continued)

*Primary Examiner* — Chuong D Ngo
(74) *Attorney, Agent, or Firm* — Seed IP Law Group LLP

(57) ABSTRACT

Techniques for improving the performance of a quantum processor are described. Some techniques employ improving the processor topology through design and fabrication, reducing intrinsic/control errors, reducing thermally-assisted errors and methods of encoding problems in the quantum processor for error correction.

23 Claims, 3 Drawing Sheets

(56) References Cited

U.S. PATENT DOCUMENTS

2012/0023053 A1 1/2012 Harris et al.
2012/0094838 A1 4/2012 Bunyk et al.

OTHER PUBLICATIONS

Amin et al., "First Order Quantum Phase Transition in Adiabatic Quantum Computation," arXiv:0904.1387v3, Dec. 15, 2009, 5 pages.

Berkley et al., "Tunneling spectroscopy using a probe qubit," arXiv:1210.6310v2, Jan. 3, 2013, 5 pages.

Dickson, "Elimination of perturbative crossings in adiabatic quantum optimization," *New Journal of Physics 13*(073011), 2011, 13 pages.

Dickson et al., "Thermally assisted quantum annealing of a 16-qubit problem," *Nature Communications 4*, Article 1903, 2013, 6 pages.

Harris et al., "A Compound Josephson Junction Coupler for Flux Qubits With Minimal Crosstalk," arXiv:0904.3784v3, Jul. 16, 2009, 5 pages.

Harris et al., "Experimental Demonstration of a Robust and Scalable Flux Qubit," arXiv:0909.4321v1, Sep. 24, 2009, 20 pages.

Harris et al., "Experimental Investigation of an Eight-Qubit Unit Cell in a Superconducting Optimization Processor," arXiv:1004.1628v2, Jun. 28, 2010, 16 pages.

Harris et al., "Probing Noise in Flux Qubits via Macroscopic Resonant Tunneling," arXiv:0712.0838v2, Feb. 8, 2008, 4 pages.

Lanting et al., "Geometrical dependence of the low-frequency noise in superconducting flux qubits," *Physical Review B 79*(060509(R)), 2009, 4 pages.

Lanting et al., "Systems and Methods for Improving the Performance of a Quantum Processor by Reducing Errors," U.S. Appl. No. 61/858,011, filed Jul. 24, 2013, 45 pages.

\* cited by examiner

SYSTEMS AND METHODS FOR IMPROVING THE PERFORMANCE OF A QUANTUM PROCESSOR BY REDUCING ERRORS

BACKGROUND

Field

This disclosure generally relates to improving the performance of a quantum processor.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian H, and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and methods, an "adiabatic" evolution is considered to be an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in, for example, U.S. Pat. No. 7,135,701 and U.S. Pat. No. 7,418,283.

Quantum Annealing

Quantum annealing is a computation method that may be used to find a low-energy state, typically preferably the ground state, of a system. Somewhat similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an (sing spin glass) and therefore quantum annealing may be used to find the solution to such a hard problem. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close to the exact solution. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Persistent Current

A superconducting flux qubit (such as a radio frequency superconducting quantum interference device; "rf-SQUID") may comprise a loop of superconducting material (called a "qubit loop") that is interrupted by at least one Josephson junction. Since the qubit loop is superconducting, it effectively has no electrical resistance. Thus, electrical current traveling in the qubit loop may experience no dissipation. If an electrical current is coupled into the qubit loop by, for example, a magnetic flux signal, this current may continue to circulate around the qubit loop even when the signal source is removed. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in the qubit loop of a superconducting qubit. The sign and magnitude of a persistent current may be influenced by a variety of factors, including but not limited to a flux signal $\Phi_x$ coupled directly into the qubit loop and a flux signal $\Phi_{CJJ}$ coupled into a compound Josephson junction that interrupts the qubit loop.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further details and embodiments of exemplary quantum processors that may be used in conjunction with the present systems and methods are described in, for example, U.S. Pat. No. 7,533,068, U.S. Pat. No. 8,008,942, U.S. Pat. No. 8,195,596, U.S. Pat. No. 8,190,548, and U.S. Pat. No. 8,421,053.

The types of problems that may be solved by any particular embodiment of a quantum processor, as well as the relative size and complexity of such problems, typically depend on many factors. Two such factors may include the number of qubits in the quantum processor and the connectivity (i.e., the availability of communicative couplings) between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative coupling paths available to three other qubits, although in any particular application all or less than all (e.g., zero, one, two, or three) of those communicative coupling paths may be employed. In a quantum processor employing coupling devices between qubits, this would mean a qubit having a connectivity of three is selectively communicably coupleable to each of three other qubits via a respective one of three coupling devices. Typically, the number of qubits in a quantum processor limits the size of problems that may be solved and the connectivity between the qubits in a quantum processor limits the complexity of the problems that may be solved.

Many techniques for using adiabatic quantum computation and/or quantum annealing to solve computational problems involve finding ways to directly map/embed a representation of a problem to the quantum processor itself. For example, US Patent Publication 2008-0052055 describes solving a protein folding problem by first casting the protein folding problem as an Ising spin glass problem and then embedding the Ising spin glass problem to a quantum processor, and U.S. Pat. No. 8,073,808 describes solving a computational problem (e.g., an image-matching problem) by first casting the problem as a quadratic unconstrained binary optimization ("QUBO") problem and then embedding the QUBO problem directly on a quantum processor. In both cases, a problem is solved by first casting the problem in a contrived formulation (e.g., Ising spin glass, QUBO, etc.) because that particular formulation maps directly to the particular embodiment of the quantum processor being employed. In other words, an intermediate formulation is used to re-cast the original problem into a form that accommodates the number of qubits and/or connectivity constraints in the particular quantum processor and then the intermediate formulation is embedded on the quantum processor. This "embedding" approach is motivated by limitations inherent in the architecture of the quantum processor being employed. For example, a quantum processor that employs only pair-wise interactions between qubits (i.e., a quantum processor employing coupling devices that provide communicative coupling between respective pairs of qubits but not, for example, between larger sets of qubits, such as three or more qubits) is intrinsically well-suited to solve problems having quadratic terms (e.g., QUBO problems) because quadratic terms in a problem map directly to pair-wise interactions between qubits in the quantum processor.

A QUBO with N variables, or spins may be written as a cost function of the form:

$$E(s) = \sum_{i}^{N} h_i s_i + \sum_{i<j} J_{ij} s_i s_j, \tag{1}$$

where $h_i$ and $J_{ij}$ are dimensionless quantities that specify a desired Ising spin glass instance. Solving this problem involves finding the spin configuration s, that minimizes E for the particular set of $h_i$ and $J_{ij}$ provided. The allowed range of $h_i \in -2, 2$ and $J_{ij} \in -1, 1$. For reasons described later, the $h_i$ and $J_{ij}$ are not perfectly represented on the hardware during optimization. These misrepresentations may be defined as control errors:

$$h_i \rightarrow h_i \pm \delta h_i \tag{2a}$$

$$J_{ij} \rightarrow J_{ij} \pm \delta J_{ij} \tag{2b}$$

Control errors $\delta h$ and $\delta J$ arise from multiple sources. Some sources of error are time dependent and others are static, but depend on a particular suite of h and J values.

Intrinsic/Control Error (ICE)

A Quantum Annealing processor may implement a time-dependent Hamiltonian of the following form:

$$\frac{\mathcal{H}(t)}{\mathcal{J}_{AFM}(t)} = -\sum_i h_i \sigma_z^{(i)} + \sum_{i,j>i} J_{ij} \sigma_z^{(i)} \sigma_z^{(j)} - \sum_i \Gamma_i(t) \sigma_x^{(i)} \tag{3a}$$

where $\Gamma_i$ (t) is a dimensionless quantity describing the amplitude of the single spin quantum tunneling, and $J_{AFM}$ (t) is an overall energy scale. Quantum annealing is realized by guiding the system through a quantum phase transition from a delocalized ground state at t=0, subject to $\Gamma_i$ (t=0)>>$h_i$, $J_{ij}$, to a localized spin state at t=$t_f$, subject to $\Gamma_i$ ($t_f$)<<$h_i$, $J_{ij}$. Further details concerning this evolution can be found in Harris et al., Experimental investigation of an eight-qubit unit cell in a superconducting optimization processor, Phys. Rev. B, Vol. 82, Issue 2, 024511, 2010 ("Harris 2010b"). The Hamiltonian given by equation 3a may be implemented on quantum annealing processors using networks of inductively coupled superconducting flux qubits and couplers as described in, for example Harris et al., Compound Josephson-junction coupler for flux qubits with minimal crosstalk, Phys. Rev. B, Vol. 80, Issue 5, 052506, 2009 ("Harris 2009") and Harris et al., Experimental demonstration of a robust and scalable flux qubit, Phys. Rev. B, Vol. 81, Issue 13, 134510 ("Harris 2010a"). As described in Harris 2010b, the dimensionless parameters $h_i$, $J_{ij}$, and $\Gamma_i(t)$ map onto physical device parameters in the following manner:

$$h_i = \frac{|I_i^p(t)|(\Phi_i^x(t) - \Phi_i^0)}{\mathcal{J}_{AFM}(t)} \quad (3b)$$

$$J_{ij} = \frac{M_{ij}|I_i^p(t)||I_j^p(t)|}{\mathcal{J}_{AFM}(t)} \quad (3c)$$

$$\Gamma_i(t) = \frac{\Delta_i(t)}{2\mathcal{J}_{AFM}(t)} \quad (3d)$$

where $\Phi_i^x(t)$ is a time-dependent flux bias applied to a qubit i, $\Phi_i^0$ is the nominally time-independent degeneracy point of qubit i, and $M_{ij}$ is the effective mutual inductance provided by the tunable interqubit coupler between qubits i and j. The time-dependent quantities $|I_i^p(t)|$ and $\Delta_i(t)$ correspond to the magnitude of the qubit persistent current and tunneling energy, respectively, of qubit i. Averages of these quantities across a processor are indicated by $|I_i^p(t)|$ and $\Delta_i(t)$. The global energy scale $J_{AFM}(t) \equiv M_{AFM}|I_i^p(t)|$, given by the Hamiltonian in equation 3a has been defined in terms of the average qubit persistent current $|I_i^p(t)|$ and the maximum antiferromagnetic (AFM) mutual inductance $M_{AFM}$ that can be achieved by all couplers across a processor.

Quantum annealing trajectory implemented on a quantum processor aims to realize time-independent $h_i$ and $J_{ij}$. The reason for doing so is to ensure that the processor realizes the target Ising spin glass instance independent of during the course of quantum annealing the state of the system localizes via a quantum phase transition. Equation 3c naturally yields a time-independent quantity upon substituting the definition of $J_{AFM}(t)$ and assuming that:

$$|I_i^p(t)| = |I_j^p(t)| = |I_q^p(t)|.$$

In order to expunge the time-dependence from $h_i$ in Equation 3b, subject to the assumption that:

$$|I_i^p(t)| = |I_q^p(t)|,$$

time-dependent $\Phi_i^x(t)$ of the form:

$$\Phi_i^x(t) = M_i \alpha |I_q^p(t)| + \Phi_i^0 \quad (3e)$$

should be applied where $\alpha |I_q^p(t)|$ represents an externally supplied bias current that emulates the evolution of the qubit persistent current $|I_q^p(t)|$ multiplied by a dimensionless factor $\alpha \gg 1$ and $M_i \equiv h_i M_{AFM}/\alpha$ is the effective mutual inductance between the aforementioned external current bias and the body of qubit i. The logic leading to equation 3e and its implementation in hardware is discussed in detail in Harris 2010b.

Equations 3a-3e link the dimensionless user-specified quantities $h_i$ and $J_{ij}$ that define an Ising spin glass instance to the physical properties of qubits and couplers. These hardware elements are subject to practical constraints, both in design and fabrication that ultimately limit the amount of control that the user can exert on the Ising spin glass parameters $h_i$ and $J_{ij}$. The term Intrinsic/Control Error (ICE) defines the resolution to which one $h_i$ and $J_{ij}$ can be realized on quantum processor (i.e., chip). Sources of error can be classified based on whether they are due to some intrinsic non-ideality of a particular device on a chip or whether they are due to the finite resolution of some control structure. Arguably, the resolution to which $\Gamma_i$ can be controlled could have significant bearing on the efficacy of quantum annealing. For the purpose of the present systems and methods, it is assumed that all $\Gamma_i(t)$ are identical.

The impact of ICE can be characterized by modifying the definitions of $h_i$ and $J_{ij}$ given above to include physical sources of error:

$$h_i \rightarrow \frac{(|I_q^p(t)| + \delta|I_i^p(t)|)(\Phi_i^x(t) - \Phi_i^0 - \delta\Phi_i^0)}{\mathcal{J}_{AFM}(t)} \quad (4a)$$

$$J_{ij} \rightarrow \frac{(M_{ij} + \delta M_{ij})(|I_q^p(t)| + \delta|I_i^p(t)|)(|I_q^p(t)| + \delta|I_j^p(t)|)}{\mathcal{J}_{AFM}(t)} \quad (4b)$$

$$\Phi_i^x(t) \rightarrow (M_i + \delta M_i)\alpha|I_q^p(t)| + \Phi_i^0 \quad (4c)$$

where the assumption is that the global variables $M_{AFM}$, $|I_q^p(t)|$, and $\alpha$ have been calibrated to high precision. A sparse network of analog control lines that allow for high precision one- and two-qubit operations can be used in order to calibrate these quantities. Thus, $\delta|I_i^p(t)|$, $\delta|I_j^p(t)|$, $\delta\Phi_i^0$, $\delta M_i$, and $\delta M_{ij}$ represent the perturbations that give rise to errors in $h_i$ and $J_{ij}$. Generally, these perturbations are small and so therefore it may be neglected in the present systems and methods so that only the errors in $h_i$ and $J_{ij}$ that are first order are taken into consideration.

If the deviations in the qubit persistent current $\delta|I_i^p(t)| \neq 0$ and $\delta|I_j^p(t)| \neq 0$ and if all other deviations are set to zero, recalling that in the ideal case $M_i \equiv h_i * M_{AFM}/\alpha$ and $M_{ij} \equiv J_{ij} * M_{AFM}$, substituting equation 4c into equation 4a and 4b then yields errors in the instance parameters of the following form:

$$\delta h_i = h_i \frac{\delta|I_i^p(t)|}{|I_q^p(t)|} \quad (5a)$$

$$\delta J_{ij} = J_{ij}\sqrt{\left[\frac{\delta|I_i^p(t)|}{|I_q^p(t)|}\right]^2 + \left[\frac{\delta|I_j^p(t)|}{|I_q^p(t)|}\right]^2} \rightarrow J_{ij}2\frac{\delta|I_i^p(t)|}{|I_q^p(t)|} \quad (5b)$$

where the assumption in the formula for $\delta J_{ij}$ is the absolute worst-case scenario in which the deviations of the two persistent currents are correlated and equal in magnitude.

Deviations in the mutual inductance $\delta M_i \neq 0$, with all others set to zero, only affect $h_i$. Substituting equation 4c into equation 4a yields:

$$\delta h_i = \frac{\delta M_i}{M_{AFM}/\alpha} \quad (5c)$$

Likewise, deviations of the qubit degeneracy point $\delta\Phi_i^0$, with all others set to zero, also only affect $h_i$. Substituting equation 4c into equation 4a yields a time dependent error:

$$\delta h_i = \frac{\delta\Phi_i^0}{M_{AFM}|I_q^p(t)|}. \quad (5d)$$

Finally, deviations in interqubit coupling mutual inductance $\delta M_{ij}$, with all others set to zero, only affect $J_{ij}$ as shown below:

$$\delta J_{ij} = \frac{\delta M_{ij}}{M_{AFM}}. \quad (5e)$$

It is worth noting that deviations in the qubit persistent current $\delta|I_i^p(t)|\neq 0$ and $\delta|I_j^p(t)|\neq 0$ lead to relative errors in the problem instance settings, as given by equations 5a and 5b. In contrast, deviations in mutual inductances and flux offsets lead to absolute errors. The convention is to define the allowed range of problem instance specifications to be $-1 \leq h_i, J_{ij} \leq 1$. For relative errors, an upper bound on an absolute error is realized if $|h_i|=|J_{ij}|=1$.

Equations 5a to 5e produce absolute errors (or upper bounds on absolute errors) as a function of perturbations in qubit persistent current $\delta|I_i^p(t)|$, qubit degeneracy point $\delta\phi_i^0$, mutual inductance $\delta M_i$, and interqubit coupling $\delta M_{ij}$. Identifying the physical mechanisms that give rise to these four quantities and studying worst-case scenarios under which those mechanisms give rise to ICE may help reduce such errors.

BRIEF SUMMARY

Processor topology may be defined as the connectivity between a set of qubits via interqubit couplers. The topology defines the ease with which an arbitrary Ising spin glass instance can be represented in the hardware. Modifications to the processor topology are given in the present systems and methods that may be both amenable to circuit layout and could improve the ease of embedding.

Intrinsic/Control error (ICE) may affect the fidelity to which an Ising spin glass instance is represented on a quantum processor. A number of mechanisms may give rise to ICE as described in the present systems and methods. Reducing ICE may improve the performance of a quantum processor. Methods of fabrication and design that may reduce ICE are also presented in the present systems and methods.

An implementation of a solid state quantum processor may interact with an environment. When the external control signals have been carefully filtered and the processor has been heat sunk to a low temperature cryogenic stage, the environment seen by the quantum processor may be a thermal bath at the temperature of that cryogenic stage. Thermodynamics dictates that the collective state of the processor and its environment, which may be referred to as an open quantum system, may trend towards thermal equilibrium. Whether the open quantum system ultimately achieves thermal equilibrium may strongly depend on the details of the open system dynamics. The influence of coupling between a quantum processor and its environment may give rise to thermally-assisted noise/error. The present systems and methods present techniques of reducing such errors.

Sources of error may be divided into two categories: static and dynamic. Static sources are quench errors that may make the final Hamiltonian different from the desired target Hamiltonian. If the ground state of the modified Hamiltonian is different from that of the target Hamiltonian, the hardware may return a wrong solution even if it succeeds in finding a ground state. ICE mechanisms may fall into this category.

Dynamical error sources are those that may cause the system to leave the ground state during quantum annealing. In this case, the system may not return the correct solution even if the final Hamiltonian is on target. Thermal activation and the physics of Landau-Zener transitions at small gap anticrossings may fall into this category. The present systems and methods further provide error correction techniques that may be used on a quantum annealing processor to improve performance.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
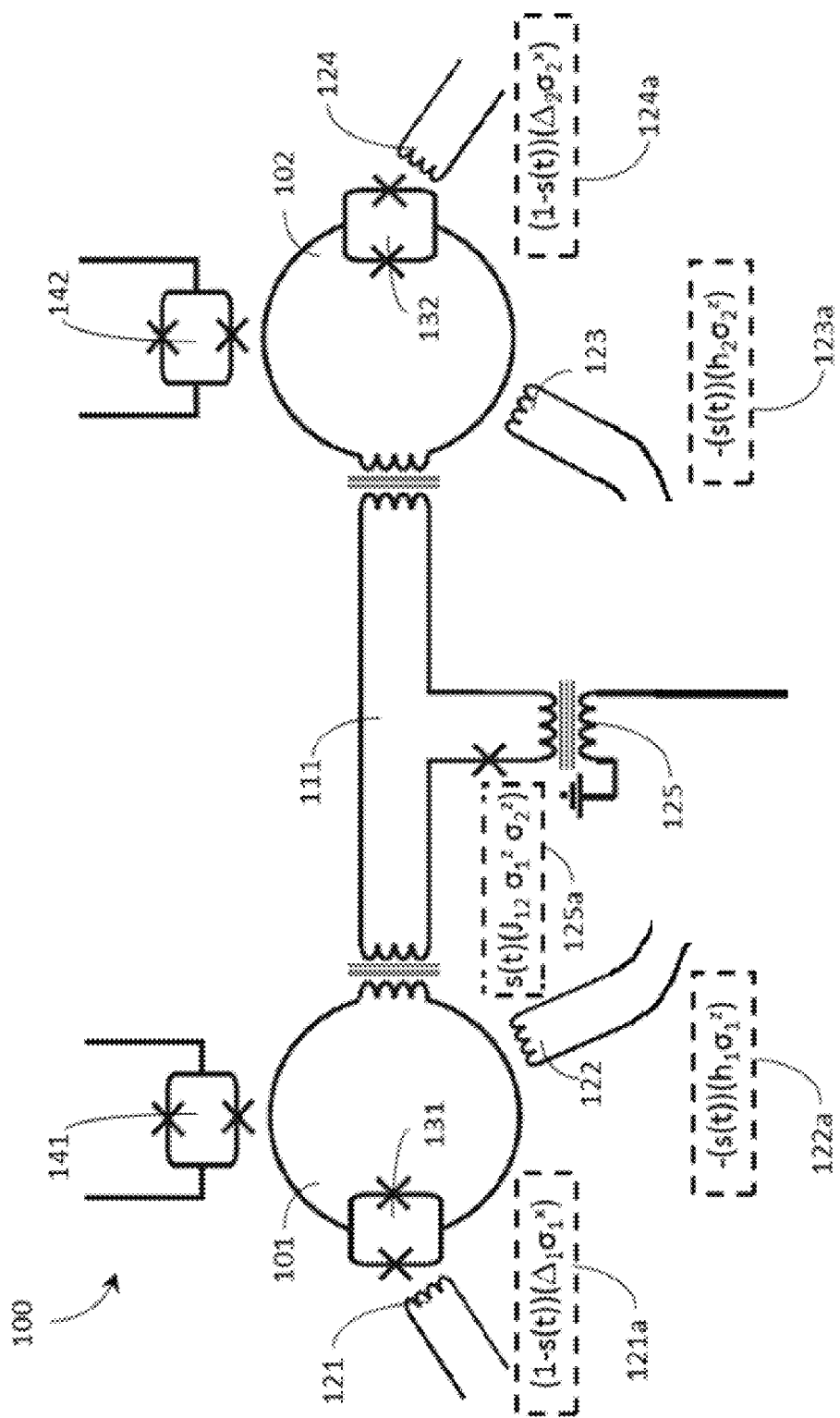
FIG. 1 is a schematic diagram of a portion of an exemplary superconducting quantum processor designed for AQC (and/or quantum annealing) that may be used to implement the present systems and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Independently tunable flux bias can be realized by a target superconducting loop subjected to the sum of the flux created by an analog bias plus that applied by a local flux DAC. DACs are described in for example, U.S. Pat. No. 8,098,179 and US Patent Publication 2012-0094838. The analog bias current can be recycled across all homologous target loops on a processor to provide what is referred to as a prebias in order to simultaneously bias all of these target loops to some common operating point. The flux DACs then provide bipolar tuning around the prebias that can be uniquely set on a per-device basis. The analog prebias may be a non-zero time-independent quantity. The analog prebias may also be the global time-dependent signal $\Phi_{CCJJ}^x$ that drives the QA algorithm.

An ideal flux qubit can be described by a Hamiltonian of the form:

$$H_q = -\tfrac{1}{2}[\epsilon_g \sigma_z + \Delta_q \sigma_x]$$

where $$\epsilon_g = 2|I_q^p|(\Phi_q^x - \Phi_q^0) \quad (6)$$

with $\Phi_q^x$ defined as the external flux bias threading the qubit body, $\Delta_q$ is the tunneling energy, and $\sigma_z$ and $\sigma_x$ are Pauli matrices. Solving this Eigen system for the ground state $|\Phi_g\rangle$ and calculating the expectation value of the persistent current operator $\hat{I}_q^p \equiv |I_q^p|\sigma_z$ yields:

$$\langle \psi_g | \hat{I}_q^p | \psi_g \rangle = |I_q^p| \frac{\epsilon_q}{\sqrt{\epsilon_q^2 + \Delta_q^2}}. \quad (7)$$

The ideal flux qubit model given by equation 7 is inadequate as it does not capture a linear background. The linear background is due to a subtle shift of the local minima of the rf-SQUID potential as a function of $\Phi_x$. This effect becomes more pronounced if the net capacitance across the CCJJ (i.e., compound-compound Josephson junction) structure of the flux qubit is large. Such data are better described by an expectation value of the form:

$$\langle \psi_g | \hat{I}_q^p | \psi_g \rangle = |I_q^p| \frac{\epsilon_q}{\sqrt{\epsilon_q^2 + \Delta_q^2}} + \chi_q(\Phi_q^x - \Phi_q^0) \quad (8)$$

where $X_q$ is a first order paramagnetic susceptibility (with units of $H^{-1}$) that captures the motion of the minima of the rf-SQUID potential as a function of $\Phi_q^x$. As such, the definition of the persistent current operator for a single isolated non-ideal rf-SQUID flux qubit should be modified in the following manner:

$$\hat{I}_q^p \equiv |I_q^p|\sigma_z \to |I_q^p|\sigma_z + X_q(\Phi_q^x - \Phi_q^0). \quad (9)$$

A key feature of this new definition of the persistent current operator is that it allows one to smoothly interpolate between the behavior of an rf-SQUID flux qubit and an rf-SQUID coupler by adjusting the magnitudes of $|I_q^p|$ and $X_q$. This naturally occurs during quantum annealing as $|I_q^p|$ monotonically grows as $\Gamma(t)$ evolves from $t=0$ to $t=t_f$ in the Hamiltonian given by equation 3a for this type of rf-SQUID flux qubit. Consequently, there is no clear dividing line between qubit and coupler as a function of rf-SQUID tunnel barrier height—both behaviors are achieved with essentially differing proportions during the course of quantum annealing.

The present systems and methods provide, among other things, techniques for encoding the problem for error correction that improve the performance of a quantum processor.

In inductively coupled network of non-ideal rf-SQUID flux qubits, the total flux impinging upon any given qubit q is no longer simply the externally applied flux $\Phi_q^x$ relative to the degeneracy point $\Phi_q^0$. A flux operator that embodies the states of the qubits to which q is coupled needs to be defined. The total flux threading qubit q may be given by:

$$\hat{\Phi}_q^{total} = \Phi_q^x - \Phi_q^0 + \sum_{i \neq q} M_{iq}(|I_i^p|\sigma_i^{(z)} + \chi_i \hat{\Phi}_i^{total}). \quad (10)$$

Updating equation 9 accordingly yields:

$$\hat{I}_q^p \equiv |I_q^p|\sigma_q^{(z)} \to |I_q^p|\sigma_q^{(z)} + X_q \hat{\Phi}_q^{total}. \quad (11)$$

Therefore, the flux threading any one qubit self-consistently depends upon the flux threading all other qubits. This, then, may impact the target Hamiltonian given by equation 3a. Substituting flux qubit parameters into that expression yields:

$$\mathcal{H} = -\frac{1}{2} \sum_q [2|I_q^p|(\Phi_q^x - \Phi_q^0)\sigma_q^{(x)} + \Delta_q \sigma_q^{(x)}] + \sum_{q,q'>q} J_{qq'} \sigma_q^{(z)} \sigma_{q'}^{(z)} \quad (12)$$

As shown in equation 12, $X_q$ may have no impact on the system Hamiltonian. However, careful attention may be needed when calculating $J_{qq'}$ from device parameters. The calculation may be readily performed to first order in $X_q$ and then justify this truncation by correctly identifying the dimensionless perturbative parameter as given below:

$$\hat{J}_{qq'} = M_{qq'} \hat{I}_q^p \hat{I}_{q'}^p \quad (13)$$

$$= M_{qq'}(|I_q^p|\sigma_q^{(z)} + \chi_q \hat{\Phi}_q^{total})(|I_{q'}^p|\sigma_{q'}^{(z)} + \chi_q \hat{\Phi}_{q'}^{total})$$

$$\approx M_{qq'}|I_q^p|^2 \sigma_q^{(z)}\sigma_{q'}^{(z)} + M_{qq'}|I_q^p|\chi_q(\Phi_q^x - \Phi_{q'}^0)\sigma_{q'}^{(z)} +$$

$$M_{qq'}|I_q^p|\chi_q(\Phi_q^x - \Phi_q^0)\sigma_\epsilon^l +$$

$$M_{qq'}|I_q^p|^2 \chi_q \left[\sum_{i \neq q} M_{iq}\sigma_i^{(z)}\sigma_{q'}^{(z)} + \sum_{i \neq q'} M_{iq'}\sigma_i^{(z)}\sigma_q^{(z)}\right] + O(\chi_q^2)$$

The final line of equation 13 contains five terms that are up to first order in $X_q$. The first term on the right side, $M_{qq'}|I_q^p|^2 \sigma_q^{(z)} \sigma_{q'}^{(z)}$, is the zeroth order in $X_q$ inter-qubit coupling. The second and third terms are linear in qubit z operators, which mean they are related to $\epsilon_q$ and $\epsilon_0$, respectively. The first of these terms arises from the external flux bias in qubit q',$\Phi_{q'}^x$, driving a persistent current that is proportional to $X_{q'}$ that is then mediated across the coupler into qubit q. The second of these terms arises from the reverse effect. The result is that finite $X_q$ allows external qubit fluxes to bleed across couplers. The fourth and fifth terms in the result are second order in qubit z operators, which indicates that they are additional inter-qubit couplings. None of these terms involve $\sigma_q^{(z)}\sigma_{q'}^{(z)}$. Rather, they all represent couplings between qubit $i \neq q(q')$ and qubit $q(q')$, as mediated through qubit $q'(q)$. These higher order couplings result from the residual coupler-like behavior of the non-ideal flux qubits, and the signal propagates from qubit i through an effective coupler composed of $M_{iq} \rightarrow$ qubit $q \rightarrow M_{qq'}$ to reach qubit $q'$. The effective mutual inductance of this higher order coupling is $M_{iq} * X_q * M_{qq'}$.

Qubit background susceptibility leads to distortion of the local biases in the Hamiltonian given in equation 3a. According to equation 13, one must modify the definition of the qubit bias energies to account for the bleeding of external flux biases:

$$\epsilon_q \rightarrow 2|I_q^p|\left[\Phi_q^x - \Phi_q^0 - \sum_{i \neq q} M_{iq}\chi_q(\Phi_i^x - \Phi_q^0)\right] \quad (14)$$

This may move qubit biases off-target and therefore impact h-terms in problem Hamiltonians. Assuming that all $\phi_q^x - \Phi_q^0$ are persistent current compensation signals of the form given by equation 3e and substituting equation 14 into equation 3b yields $$h_q \rightarrow h_q - M_{AFM}\chi_q \sum_{i \neq q} J_{iq}h_i. \quad (15)$$

If the range of interqubit couplings is restricted to within $-1 \leq J_{ij} \leq 1$ and local biases to within $-1 \leq h_i \leq 1$, the magnitude of the intrinsic errors imparted by $X_q$ will be $|\delta h_q| \leq M_{AFM} * Xq$ per interqubit coupling.

Qubit background susceptibility may also distort the J-terms in the Hamiltonian of equation 3a. For an arbitrary processor topology, $$\mathcal{J}_{qq'} \rightarrow M_{qq'}|I_q^p|^2 + \sum_{i \neq \{q,q'\}} M_{iq}\chi_q M_{iq'}|I_q^p|^2 \quad (16)$$

Thus, the net coupling between qubits q and q' is the sum of the intended direct coupling $M_{qq'}$ plus the indirect paths mediated across all other qubits $i \neq \{q, q'\}$. Translating into problem Hamiltonian specification, equation 16 may become:

$$J_{qq'} \rightarrow J_{qq'} + M_{AFM}\chi_q \sum_{i \neq \{q,q'\}} J_{iq}J_{iq'}. \quad (17)$$

If the range of interqubit couplings are restricted to within $-1 \leq J_{ij} \leq 1$, then the magnitude of the intrinsic errors imparted by $X_q$ may be $|\delta J_{qq'}|M_{AFM} * X_q$ per mediated coupling. The number of terms in the sum in equation 17 may depend on the processor topology. For example, for a 6-connected processor qubits, that number may be 4.

Given equations 15 and 17, the truncation of equation 13 to first order in $X_q$ may now be justified. For example, if the terms to higher orders in $X_q$ alluded to in equation 13 contain dimensionless quantities of the form $(M_{AFM} * X_q)^n \ll 1$ for $n \leq 2$, then they may be safely neglected.

The dominant non-ideality of an rf-SQUID flux qubit may a faint whisper of coupler-like behavior due to the background linear susceptibility $X_q$. In contrast, rf-SQUID interqubit couplers may be designed to provide a linear response to external flux. The dominant non-ideality of an rf-SQUID coupler may be a weak qubit-like response on top of a linear susceptibility $X^{(1)}$. When properly designed and operated, this weak qubit-like response may become manifested through a third-order susceptibility $X^{(3)}$. The coupling energy between qubits i and j may be expressed as:

$$J_{ij} = (M_{ql}M_{qr}X^{(1)}|I_q^p|^2 + \frac{1}{3}M_{ql}^{(3)}|I_q^p|^4 + \frac{1}{3}M_{ql}M_{qr}^{(3)} \\ X^{(3)}|I_q^p|^4)\sigma_i^z\sigma_j^x \quad (18)$$

where $M_{ql}$ and $M_{qr}$ represent the transformer mutual inductances between the coupler body and the qubits to the left (l) and right (r), respectively. Translating into problem Hamiltonian specification:

$$J_{ij} \rightarrow J_{ij}\left[1 + \frac{\chi^{(3)}|I_q^p|^2}{3\chi^{(1)}}(M_{ql}^2 + M_{qr}^2)\right] \quad (19)$$

If the range of interqubit couplings is restricted to within $-1 \leq J_{ij} \leq 1$, then the magnitude of the intrinsic errors imparted by $X^{(3)}$ may be:

$$|\delta J_{ij}| \leq (M_{ql}^2 + M_{qr}^2)X^{(3)}|I_q^p|^2/3X^{(1)}.$$

Low frequency flux noise may give rise to an uncertain amount of flux in the qubit body, which may then result in an error in the problem parameter $h_i$. Fabricating all other closed inductive loops such that they are sufficiently small may make the low frequency flux noise to be negligible, as described in, for example Lanting et al., Geometrical dependence of low frequency noise in superconducting flux qubits, Phys. Rev. B, Vol. 79, 060509, 2009 ("Lanting").

Using room temperature current sources during calibration and operation may help realize multiple independently tunable flux biases on a quantum processor. However, control errors may still be imparted by bias line noise of which the most important error mechanism may be on-chip crosstalk. Crosstalk may be defined as a mutual inductance between an external current bias line and an unintended target loop. If an analog bias carries a time-independent signal, then crosstalk from that line may lead to time-independent flux offsets in unintended target loops. If each such loop is equipped with a flux DAC, it may be possible to apply compensation signals. The most significant time-dependent crosstalk may be those arising from the CCJJ analog bias that drives quantum annealing process. Crosstalk into CJJ (compound Josephson junction) loops may lead to time-dependent variation of the critical currents of those structures, which may then alter the qubit persistent current $|I_q^p|$ and the qubit degeneracy point $\Phi_q^0$.

These mechanisms may then give rise to errors in the problem settings $h_i$ and $J_{ij}$. Likewise, crosstalk into the qubit body may lead to an error in the problem setting $h_i$.

In order to realize a particular (sing spin glass instance on quantum processor, the parameters $h_i$ and $J_{ij}$ used in the Hamiltonian of equation 3a may need to be translated into flux biases that are to be applied to devices on chip. The translation process may involve inverting a calibrated model of device response versus flux bias in order to determine the required bias. The result of such a calculation may then determine the required flux DAC settings. For example, if a desired flux bias to within ±half of the LSD weight may be realized for a particular target loop, the resulting roundoff error may then manifest as a control error.

It is important to recognize that a single numerical value may not be ascribed to a particular ICE mechanism as the qubit parameters $|I_q^p|$, $\Delta_q$, and $X_q$ may all change with annealing bias $\Phi_{CCJJ}^x$. This may have serious implications for the magnitude of ICE as annealing progresses, for example with quantum annealing starting at $\Phi_{CCJJ}^x/\Phi_0=0.5$ and ending at $\Phi_{CCJJ}^x/\Phi_0=1$. However, there may be a narrow domain in $\Phi_{CCJJ}^x$ over which most of the critical system dynamics occur and therefore focus may be given therein. The details of the processor dynamics may strongly depend on the particular Ising spin glass instance that has been programmed into the hardware. However, the critical domain of $\Phi_{CCJJ}^x$ may be roughly identified using the following:

1. An infinitely long 1-dimensional quantum Ising spin chain may exhibit quantum criticality when $\Gamma_i(t)=1$ in the Hamiltonian of equation 3a. Using equation 3d, this condition may be satisfied when $\Delta_q=2J_{AFM}$.
2. For an isolated single qubit that is subject to quantum annealing, as the tunnel barrier is raised in ramping from, for example, $\Phi_{CCJJ}^z/\Phi_0=0.5$ to $\Phi_{CCJJ}^x/\Phi_0=1$, the qubit may be free to tunnel between the two localized spin states provided the tunnel dynamics are sufficiently fast. Eventually, the tunneling energy may become exponentially suppressed with increasing tunnel barrier height and the state of the qubit may become localized. The state of the qubit may then be effectively sampled at some intermediate annealing bias $0.5<\Phi_{CCJJ}^c/\Phi_0<1$.

Any ICE mechanism that may impact qubit persistent current or degeneracy point may need to be studied over the domain of annealing bias $\Phi_{CCJJ}^x$ that is relevant for quantum annealing. Any ICE mechanism that may impact a tunable mutual inductance may need to be studied over the operating range of that coupling device, be it a persistent current compensator (IPC) or inter-qubit coupler (CO). IPCs are described in, for example, US Patent publication 2011-0060780.

Calibrating $\Phi_q^0$ using a fast single qubit annealing measurement that samples the state of the qubit at for example, $\Phi_{CCJJ}^x/\Phi_0=0.71$ may make a quantum processor become sensitive to shifts in $\Phi_q^0$ relative to the calibrated quantity. The dominant ICE mechanisms that may give rise to errors in $h_i$ in quantum processor are low frequency flux noise in the qubit body $\Phi_q^n$, qubit non-ideality $X_q$, and CJJ-DAC LSD (least significant digit) weight influencing the qubit degeneracy point $\Phi_q^0$. Other such notable mechanisms are the analog bias crosstalk CCJJ→QFB and CCJJ→CJJ. Low frequency flux noise may be addressed through materials research and improved fabrication. Further improvements in fabrication may also reduce the errors attributed to CJJ-DAC LSD weight. Since the response of the CJJ loops may become increasingly nonlinear at larger bias, the control error imposed by finite CJJ-DAC LSD weight may be aggravated. If the spread in Josephson junction critical current were reduced to for example ±1%, then much of the problem may be remedied by choosing smaller prebiases for the CJJ loops. Through improved on-chip magnetic shielding designs, magnitude of analog bias crosstalks may be significantly reduced.

The dominant $\delta J_{ij}$ error mechanisms for a quantum processor may be qubit non-ideality, CJJ-DAC LSD weight influencing the qubit persistent current, and CCJJ-DAC LSD weight. As previously described, issues related to CJJ-DAC LSD weight may be resolved by improvements in fabrication which would then facilitate choosing less aggressive prebiases for the CJJ loops. The CCJJ-DAC LSD weight may be adjusted in revisions of the quantum processor through careful design work or redesigning the processor. Furthermore, control errors in CO-DAC LSD weight (i.e., coupler-DAC LSD weight) may be alleviated through rework of coupler parametric designs.

For example, consider a phenomenological function of the form $\delta=C*N^{-\alpha}$ where C is a numerical prefactor related to the processor topology and N is the graph size. If each realized instance parameter $h_i+\delta h_i$ and $J_{ij}+\delta H_{ij}$ has an error that is independent and Gaussian distributed around its target value $h_i$ and $J_{ij}$, respectively, then the energy $E_m$ of each state m may increase or decrease linearly with $\delta h_i$ and $\delta J_{ij}$. Therefore, the deviations in the instance Eigen spectrum may also possess Gaussian distributions over all noise instances. On average, the energy of the $m^{th}$ energy level, $E^m$, may be expected to move randomly with respect to the $n^{th}$ energy level, $E_n$, when viewed over all possible noise instances. Assuming that all $\delta h_i$ and $\delta J_{ij}$ are independent, the mean change in energy of any one level $\delta E$ may be found by adding all of the perturbations in quadrature, which may then yield $\delta E \sim C\sqrt{q(N*\delta)}$. The probability of interchanging any two energy levels (for example, swapping a ground state and a first excited state) and thus the probability of solving the correct problem may then be related to the overlap of two Gaussian shifted energy level probability distributions. Taking the energy spacing between the unperturbed neighboring energy levels to be A and assigning a width $\delta E$ to the probability distribution versus energy for each level, this probability may be shown to be $\propto \exp\{-A^2/4*(\delta E)^2\}$. Thus, in order to maintain a constant probability of solving the wrong problem with increasing graph size, $\delta E$ may need to be kept constant/may need to be maintained. For $\alpha=0.5$, the errors $h_i$ and $J_{ij}$ may need to be decreased by a factor of 2 for every factor of 4 increase in number of qubits. As such, for a one million qubit processor, this may mean decreasing $\alpha=0.5$ by a factor of 44 to yield $\delta=0.001$.

The present systems and methods taught herein may provide, among other things, techniques for improving the hardware graph (i.e., the arrangement of qubits in a quantum processor), reducing ICE, reducing thermally-assisted noise and encoding the problem for error correction for improving the performance of a quantum processor.

Techniques for improving the design of a hardware graph may include: bisectional bandwidth, algebraic connectivity, number of qubits reachable in a given number of "hops", presence or absence of odd cycles, treewidth, etc. Bisectional bandwidth may define the ability to separate a processor into at least two equally sized portions. Coupling devices may be used to communicatively couple the qubits in separate portions. Algebraic connectivity may define the difference in magnitude between the eigenvalues corresponding to the ground and the first excited eigenvectors of a hardware graph's adjacency matrix (or, magnitude of first non-zero eigenvalue of its Laplacian). This quantity may be viewed as a measure of the rate of diffusion through a hardware graph (for example, heat, or a drop of ink percolating along all available edges) and therefore a measure of its "global connectivity." Number of qubits reachable in a given number of "hops" may be a quantity related to algebraic connectivity. For example, the upper bound of 6-connected qubits reachable in two hops is 6×5=30. Presence or absence of odd cycles indicate that problems on non-bipartite graphs may intuitively seem "harder." Classical branch-and-bound algorithms have exponential run times with respect to graph treewidth and not the total number of nodes. Therefore, quantum annealing processors may become more powerful than classical approaches by increasing the treewidth.

Connecting pairs of peripheral qubits together may only have an $O(\sqrt{N})$ perimeter effect (N being the number of qubits), thus not really improving the connectivity of a quantum process. Therefore, much better use of the processor's perimeter may be to use it to attach devices which are beneficial, even if their count scales slower than N, thus allowing new modes of operation of the quantum annealing processor. For example, special-purpose probe qubits that could facilitate measuring the Eigen spectrum of the network of qubits part way through the quantum annealing algorithm, as described in Berkley et al., Tunneling spectroscopy using a probe qubit, Phys. Rev. B, Vol. 87, 020502 (R), 2013 ("Berkley"), may be used to attach to the perimeter of a hardware graph in order to make use of unused coupling devices at processor edges.

Wrapping the processor fabric into a cylinder or a torus may reduce the average distance between a pair of qubits by a factor of for example, two or four. This option might become advantageous in 3D chip packaging or if multiple processors were fit in an individual chip.

Furthermore, adding more coupling devices inside the hardware graph to increase the treewidth of the processor as well as strategically placing "long-range" couplers may help improve the design of the processor chip.

When the number of qubits in a quantum processor is increased, the number of programming lines may also need to be increased. However, implementing a QFP-based DAC addressing scheme, based on the idea that flux biases which distinguish selected versus unselected DAC stages, applied by room-temperature programming lines, may be applied using on-chip superconducting devices connected in a logarithmic tree or a serial scan-path fashion, which may drastically reduce the number of lines required to program the processor. QFPs are described in, for example, U.S. Pat. No. 8,169,231 and U.S. Pat. No. 7,843,209.

Fabrication process improvements may also improve the performance of a quantum processor chip, particularly with an increased number of qubits (for example, 2000 qubits, 1_million qubits, etc.). Such fabrication process improvements may include increasing the number of metal layers comprised in a quantum processor chip, Integration of a high-$J_c$ trilayer in the process, thickening insulator layers (i.e., increasing inductance per unit area in the DACs), reducing the size of the tiles of unit cells comprised in the hardware graph, implementation of multi-chip processors, etc.

Techniques for reducing ICE may include comprehensive modeling of chip structures to remove uncontrolled crosstalks, increasing the dynamic range of both the CJJ-DAC and CCJJ-DAC for qubit synchronization, designing a more linear inductance tuner (i.e., "L-tuner" as described in for example, US Patent Publication 2011-0057169) using either more Josephson junctions or larger critical current Josephson junctions, designing a parametrically different coupler that may greatly reduce CO-DAC LSD ICE (coupler-DAC least significant digit ICE) in for example, strong ferromagnetic regime and improved modelling in order to develop a better qubit body DAC LSD (QFB-DAC LSD) design.

In detail, low frequency flux noise in the qubit body $\Phi_q''$ which may increase ICE may be reduced by changes applied to the fabrication process both material and design-wise. Qubit background susceptibility $X_q$ which also increases ICE may be reduced by reducing the line width of the qubits (for example, by about a factor of 2) and correspondingly reducing their length by the same factor. This may reduce qubit capacitance, which may then render the qubit Eigen states less sensitive to fine variations in the qubit rf-SQUID potential, which is responsible for $X_q$.

Increasing the wiring layers of a quantum processor chip may allow for reduction in qubit length. For example, doubling of the existing number of wiring layers in a chip may allow for approximately a factor of 2 reductions in qubit length.

Reducing the diameter of the Josephson junctions comprised in a quantum processor may allow for an increase in junction critical current density $J_c$, thus shrinking junctions in DACs proportionally, which may then allow a trade off some options: 1) reduce the unit cell area and, therefore, qubit length, 2) achieve a larger DAC dynamic range and precision using the existing footprint. An optimum may be some combination of these two options. Smaller Josephson junctions in the qubits may also reduce qubit capacitance, which may then augment qubit energy scales and reduce qubit background susceptibility $X_q$.

Furthermore, fabricating two Josephson junction modules, one being dedicated to qubit and the other being dedicated to DACs may decouple DAC designs from qubit parameters and may therefore allow for design of higher $J_c$ junctions in the DACs which may essentially allow them to shrink.

Fabrication improvements such as decreasing flux noise (for example, to approximately $1\mu\Phi_0/\sqrt{Hz}$ at 1 Hz) and reducing the line width (for example, from 0.25 µm lines and spaces to approximately 0.15 µm lines and spaces) may increase DAC storage capacity, thereby improving control precision (for example, by a factor of 2). ICE may be further reduced by alternate qubit designs that may seek to minimize background susceptibility or that may provide orthogonal control of non-orthogonal parameters such as $|I_q^p|$ and $\Delta_q$.

The evolution of an example Eigen spectrum as a function of annealing bias $\Phi_{CCJJ}^x$ may be roughly divided into three phases based on the relative magnitude of $\Gamma$ in the Hamiltonian of equation 3a, with $\Gamma \gg 1$ denoting the initialization phase, $\Gamma \sim 1$ being the quantum critical phase, and $\Gamma \ll 1$ being the localization phase. During the initialization phase, the Hamiltonian of equation 3a is approximately given by:

$$\mathcal{H}(t) \approx -\frac{1}{2}\Delta_q \sum_i \sigma_x^{(i)} \tag{20}$$

where the low lying Eigen states of the system can be described as products of the Eigen states of the independent qubits. For any finite coupling of the qubits to their environment, every qubit may be initialized in its ground state with high fidelity.

As quantum annealing progresses into the quantum critical phase, $2J_{AFM} \sim \Delta q$ and the Eigen states of the Hamiltonian of equation 3a are typically superpositions of localized spin states. The energy spacings between the low lying states of the processor may become less than or comparable to $k_B T$ and the processor may trend towards a mixed thermal state. Consequently excited states may become populated at the expense of ground state probability, thus potentially compromising processor performance. However, the rate at which the ground state is depopulated and excited states are populated depend on quantum mechanical matrix elements, as mediated by the environment, between all pairs of initial and final states. Finally, in the localization phase, Hamiltonian of equation 3a is approximately given by:

$$\mathcal{H}(t) \approx J_{AFM}\left[\sum_i h_i \sigma_z^{(i)} + \sum_{i,j>i} J_{ij}\sigma_z^{(i)}\sigma_z^{(j)}\right] \quad (21)$$

where the Eigen states of the system may become localized spin states. The state of the system may then be quenched by two factors: First, as $\Gamma(t) \rightarrow 0$ in Hamiltonian of equation 3a, the matrix elements between processor states may become small. The definition of $\Gamma$ given in equation 3d ensures that those matrix elements decrease exponentially as quantum annealing reaches completion. Second, at some point during quantum annealing, it becomes inevitable that the qubit tunneling energy $\Delta_q \ll W$, where W is the integrated spectral density of the noise environment of a single qubit. Once in this regime, even the single qubit dynamics may become incoherent and the timescale for tunneling may scale as $\tau \sim hW/(\Delta_q)^2$, which is considerably slower than the coherent evolution timescale $\tau_q \sim h/\Delta_q$ as described in, for example Harris et al., Probing Noise in Flux Qubits via Macroscopic Resonant Tunneling, Phys. Rev. Lett., Vol. 101, Issue 11, 117003, 2008 ("Harris 2008"). In this regime the processor can only evolve via few-qubit incoherent tunneling processes over any reasonable timescale and its state may be therefore, effectively localized.

Thermalization may or may not hinder or help quantum annealing. Those of skill in the art may expect that activation from the ground state to excited states negatively impacts quantum annealing processor performance, while relaxation from excited states to the ground state would be beneficial. However, thermal occupation of excited states in the quantum critical phase may lead to higher ground state probability in the localization phase, thus improving performance, as described in, example Dickson et al., Nature Communications 4, Article 1903, 2013 ("Dickson"). Since $J_{AFM}$ may continue to grow in the localization phase, then the ratio $J_{AFM}/k_B T$ may increase, thus favoring relaxation from excited states. If those excited states are relatively few spin flips (i.e., small Hamming distance) from a ground state, then both thermal relaxation and post-processing using a local search-based classical algorithm may improve performance. If those excited states are many spin flips (i.e., a larger Hamming distance) from a ground state, then neither relaxation nor post-processing using a classical search may improve performance. Therefore, temperature may strongly affect processor performance. A complete quantitative description may require modeling the behavior of the multi-qubit system. However, using a system of a linear antiferromagnetic (AFM) chain of Ising spins with coupling $J_{AFM}$ between nearest neighbors as a toy model to study the effects of temperature on performance versus N may be a simple yet instructive problem to solve.

Decreasing temperature T may improve processor performance. A possible solution to decreasing T may be to Build dilution refrigerators that can achieve a base temperature as low as, for example T=3mK. However, it is challenging to achieve a thermal environment on the order of a few mK on a quantum processor that requires a large number of external biases. For example, a quantum processor that use a number of external biases that are low pass filtered down to $f_c$=30 MHz corresponds to a temperature scale of $hf_c/k_B \sim 1.5$ mK. Thus the effective temperature of the electromagnetic environment can be higher than the physical temperature of the quantum processor chip at T≤10 mK. Therefore, effort spent reducing the physical temperature T≤10 mK may need to be carefully matched with effort in improving signal filtering.

Adding more wiring layers to the fabrication stack of a quantum processor chip and making strategic changes to dielectric thicknesses may allow for compacting the area of qubits and collection of qubits (i.e., "unit cells"). Compacting the unit cells may result in physically shorter qubits, which may then drive their associated energy scales up. Further, flux qubits with smaller bodies that make only a small contribution to the qubit capacitance may be fabricated which may result in only the Josephson junctions becoming the dominant contributor to qubit capacitance.

Adopting encoding strategies to further counter the influence of temperature in a large-scale quantum annealing processor may also allow for improving the performance of the quantum processor. Such encoding techniques may be referred to "error correction."

Sources of error may be divided into two categories: static and dynamic. Static sources may be quench errors that make the final Hamiltonian different from the desired target Hamiltonian. If the ground state of the modified Hamiltonian is different from that of the target Hamiltonian, then the hardware will return a wrong solution even if it succeeds in finding a ground state. All of the ICE mechanisms described previously may fall into this category. Dynamical error sources may be those that cause the system to leave the ground state during quantum annealing. In this case, the system may not return the correct solution even if the final Hamiltonian is on target. Thermal activation and the physics of Landau-Zener transitions at small gap anticrossings fall into this latter category.

Quantum annealing is inherently a probabilistic algorithm. As such, there may be a finite probability of error in any calculation. If the probability of success in a single repetition of the QA algorithm is $P_{success}$, then the probability $P_k$ of observing at least one success after k repetitions may be $$P_k = 1 - (1 - P_{success})^k. \quad (22)$$

Solving for the number of iterations k then yields $$k = \frac{\ln(1 - P_k)}{\ln(1 - P_{success})}. \quad (23)$$

Therefore, $P_k$ may be made arbitrarily close to 1 by repetition, provided a success criterion is at hand in order to verify trial solutions returned by the quantum annealing processor. However, small $P_{success}$ may lead to a very large k, thus rendering quantum annealing inefficient. Therefore, it is means to augment $P_{success}$ success may be prudent, but repetition means that quantum annealing need not achieve $P_{success}=1$ in order to be useful.

Quantum annealing may be used in conjunction with post-processing by classical search algorithms. If a system becomes localized in an excited state and that state is relatively few spin flips (i.e., small Hamming distance) from a ground state, then a local search may be an efficient means to recover from such an error. Doing so may also be an effective means of correcting for statistically infrequent processor readout errors. However, as with thermal relaxation, if those excited states are many spin flips (i.e., larger Hamming distance) from a ground state, then post-processing may not be efficient.

In general, there may be different ways to pose a given optimization problem as an Ising spin glass Hamiltonian. Ideally, all of these Hamiltonians may be equivalent and may lead to the same solutions. In practice, however, because of static errors, the final Hamiltonians that are realized on the processor may be different. For some of these Hamiltonians, the effect of the errors may be large enough to completely change the ground state. By examining multiple different yet equivalent Hamiltonians, the chance that at least one of these Hamiltonians is sufficiently on target may be increased so as to provide a correct ground state.

Reassigning the problem variables to different combinations of qubits on the processor may result in a new embedding. For example, by applying a sequence of rotations and reflections to a given embedding to generate a new embedding on a functional quantum processor and by running the same problem on the hardware with different embeddings, a large number of combinations of static errors may be sampled over to find the optimal solution to the original problem. Such techniques are discussed in, for example, US Patent Publication 2012-0023053.

A change of variables technique may also be used to change problem Hamiltonians. For example, for the problem energy functional given below:

$$E(s) = \sum_i h_i s_i + \sum_{i,j>i} J_{ij} s_i s_j \quad (24)$$

applying the transformation: $s_i \to s'_i = \alpha_i * s_i$, where $\alpha_i = \pm 1$ to write $$E(s') = \sum_i h'_i s'_i + \sum_{i,j>i} J'_{ij} s'_i s'_j \quad (25)$$

by choosing $$h'_i = \alpha_i * h_i; \; J'_{ij} = \alpha_i * \alpha_j * J^{ij} \quad (26)$$

makes equations 24 and 25 become equivalent. Therefore, equation 25 with the changed variables and associated parameters of equation 26 may solve the same problem. A set of $\{\alpha_i\}$ may be picked randomly and hardware may be run to obtain $\{s'_i\}$. In other words, in order to generate instances with changed variables, a set of qubits in the quantum processor may be randomly flipped and for each instance, the probability of finding a ground state $P_{success}$ may be recorded. The actual solution to the original problem may be obtained by the inverse transformation: $s_i = \alpha_i * s'_i$. The probability of finding the solution may be increased by repeating quantum annealing for many different changes of variables.

Encoding a single logical qubit into a number of physical qubits may help reduce both static and dynamic errors. Encoding may be accomplished by, among other things, ferromagnetically coupling a small number of physical qubits to each other so that they globally represent one logical variable (logical qubit). Such logical qubits are described in, for example, U.S. Pat. No. 8,174,305. Majority rule may be used to decide the state of the logical qubit after readout. This way, static or dynamic errors that may cause flipping of a small number of physical qubits (minority within a logical qubit) may be corrected.

Encoding may also reduce ICE by distributing problem parameters over the physical qubits. For example, suppose due to ICE, the hardware allows the (unnormalized) bias applied to the $i^{th}$ qubit to only have 2n+1 integer values: $h_i = 0, \pm 1, \ldots, \pm n$. Now, if a logical qubit is encoded using m physical qubits, then the effective bias $f_i^{eff}$ applied to the logical qubit is the sum of all biases applied to the physical qubits within the logical qubit. Therefore, the effective bias can range from $-nm$ to $nm$, with $2nm+1$ possible values, which is larger than before. This leads to finer control of the value of $h_i^{eff}$ compared to the normalized $h_i$ that would be applied to a single qubit.

When the parameters are subject to random static errors, encoding may increase the signal to noise ratio. As described above, the range of the effective bias $h_i^{eff}$ is increased with the number of qubits within a logical qubit $\propto m$. If a random error with the standard deviation $\delta$ is added to the bias applied to each physical qubit within a logical qubit, then the overall error that the logical qubit sees may have a standard deviation equal to $\sqrt{(m\delta)}$. Therefore, the signal to noise ratio may be improved by a factor of $\sqrt{m}$.

Encoding may reduce dynamic errors by increasing the effective energy scale. Increasing the energy scale of a Hamiltonian may reduce errors by increasing the size of the minimum gap and also by reducing the thermal excitation probability via increasing the exponents in the Boltzmann factor $e^{-(E/k_BT)}$. Both of these effects are exponential and therefore small increases in the energy scale may lead to a large gain in probability of success. With reference to the above example, if one logical qubit can be coupled to a neighboring logical qubit via k physical qubits, the effective coupling between the two logical qubits may be the sum of the k couplings. Therefore, the maximum coupling energy may be enhanced by a factor of k. If the bias energy is also enhanced by the same factor, the total energy scale of the problem Hamiltonian may be effectively enhanced, which may lead to smaller dynamic errors.

A closed quantum system that encounters an exponentially small gap anticrossing between its two lowest Eigen states may require an exponentially long annealing time in order to stay in the ground state. At large scales, it is expected that small gap anticrossings may become a major source of dynamic error. An open quantum system may benefit from thermal noise by exciting the system to the first excited state before the anticrossing and therefore reaching the final ground state via adiabatic crossing.

Some types of anticrossings may be removed by changing the annealing path. These types of anticrossings may be referred to as perturbative crossings which may occur when an Eigen state that corresponds to a superposition of a group of local minima of the problem Hamiltonian crosses the Eigen state that corresponds to the superposition of the global minima, as described in, for example, Amin et al., First-order quantum phase transition in adiabatic quantum computation, Phys. Rev. A, Vol. 80, Issue 6, 062326, 2009 ("Amin 2009"). The minimum gap may be exponentially related to the Hamming distance between the global and local minima. Therefore, for large Hamming distances, the minimum gap may become exponentially small. These anticrossings are very sensitive to the system parameters and may be avoided by changing the annealing path.

The time-dependent quantum annealing Hamiltonian of equation 3a may be written as:

$$H = \mathcal{J}_{AFM}(t)\mathcal{H}_P - \frac{1}{2}\sum_i \Delta_i(t)\sigma_i^x \quad (27)$$

where $H_p$ is the dimensionless problem Hamiltonian. Quantum annealing involves simultaneously increasing $J_{AFM}(t)$ and decreasing all $\Delta_i(t)$ until the latter vanish. It is assumed that all $\Delta_i$ are uniform. This may be realized in quantum annealing processor by ramping a single annealing bias that is applied to all qubits. For this particular physical implementation of quantum annealing, there may only be a single bias, namely $\Phi_{CCJJ}^x(t)$, that simultaneously controls both $J_{AFM}(t)$ and $\Delta_i(t)$, which may lead to a particular so-called annealing path.

If, for example, for a given Ising spin glass instance, the particular annealing path that has been implemented in a quantum processor happens to encounter a small gap perturbative crossing, then a dynamic error may occur in every repetition of quantum annealing. However, there may be many different paths that reach the same final Hamiltonian if $\Delta_i$ is allowed to be non-uniform. A random change of the annealing path may not always be the most efficient way of solving the problems, especially if there are many anticrossings that need to be removed. Any random change of $\Delta_i$ may remove some of the anticrossings, but bring in other anticrossings in the way.

Rather than using random changes in $\Delta_i(t)$, values of $\Delta_i(t)$ may be adaptively changed based on the failures of previous iterations of quantum annealing. Every time the system makes adiabatic crossing, it may end up in an excited state that is a superposition of many local minima. These local minima may be sampled and then changes may be implemented to a particular $\Delta_i(t)$ in such a way that the system may readily tunnel from those minima during quantum annealing.

Another method to remove perturbative crossings may be based on adding ancillary qubits in such a way to increase the degeneracy of the global minima as compared to that of the competing local minima. For example, suppose an additional (ancillary) qubit is coupled to one of the system qubits. The applied bias to the ancillary qubit may be tuned in such a way that the global minima of the energy of the system do not change by flipping the state of the ancillary qubit but it may change the energy of the local minima. The new Hamiltonian, therefore, may have twice as many global minima, while the number of the local minima may remain unchanged. As described in, for example, Dickson, Elimination of perturbative crossings in adiabatic quantum optimization, New Journal of. Physics, Vol. 13, 073011, 2011 ("Dickson 2011"), adding enough ancillary qubits in a systematic way may can sufficiently increase the degeneracy of the global minimum as compared to the local minima so that no perturbative crossings may occur. The number of ancillary qubits may become very large if all perturbative crossings need to be provably removed. However, a heuristic algorithm may be designed that learns from the local minima as they are encountered in the failed annealing runs in order to efficiently choose the placement of ancillary qubits. Often there are unused physical qubits on a processor after having embedded a given Ising spin glass instance. Therefore, this method could provide a way to reduce dynamic errors due to perturbative crossings at no extra cost. A more elegant implementation of this technique may require incorporating ancillary qubits into the design of the hardware graph (i.e., arrangement of qubits in a quantum processor).

Throughout this specification and the appended claims, the term "logical qubit" is used to describe a collection/chain/sequence/series/set of communicatively coupled qubits that act as a single qubit. In other words, a chain of communicatively coupled qubits that may collectively represent a single variable of a problem may be referred to as a logical qubit. Therefore, a logical qubit may comprise more than one qubit. However, a chain of communicatively coupled qubits may not always be a logical qubit as the individual qubits in the chain of qubits may represent different variables of a problem. When a chain of qubits are programmed to represent a single variable such that the chain of qubits collectively act as a single qubit, that chain of qubits may then be called a logical qubit. According to the present systems and methods, a logical qubit may at least be formed by communicatively coupling a first qubit to a second qubit such that the first qubit and the second qubit collectively behave as one qubit.

The various embodiments described herein provide systems and methods for reducing errors and thereby improving the performance of a superconducting quantum processor. As an illustrative example, a superconducting quantum processor designed to perform adiabatic quantum computation and/or quantum annealing is used in the description that follows. However, a person of skill in the art will appreciate that the present systems and methods may be applied to any form of quantum processor hardware implementing any form of quantum algorithm(s) (e.g., adiabatic quantum computation, quantum annealing, gate/circuit-based quantum computing, etc.).

A typical adiabatic evolution may be represented by equation 28:

$$H_e = (1-s)H_{In} + sH_f \tag{28}$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M.H.S., "Effect of local minima on quantum adiabatic optimization", PRL 100, 130503 (2008), is to start with an initial Hamiltonian of the form shown in equation 29:

$$H_{In} = -\frac{1}{2}\sum_{i=1}^{N} \Delta_i \sigma_i^x \tag{29}$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{N} h_i \sigma_i^z + \sum_{i,j=1}^{N} J_{ij}\sigma_i^z\sigma_j^z\right] \tag{30}$$

where N represents the number of qubits, $\sigma_i^z$ is the Pauli z-matrix for the $i^{th}$ qubit, $h_i$ and $J_{i,j}$ are dimensionless local fields coupled into each qubit, and $\in$ is some characteristic energy scale for $H_f$. Here, the $\sigma_i^z$ and $\sigma_i^z\sigma_j^z$ terms are examples of "diagonal" terms. Throughout this specification, the terms "final Hamiltonian" and "problem Hamiltonian" are used interchangeably. Hamiltonians such as $H_{In}$ and $H_f$ in equations 29 and 30, respectively, may be physically realized in a variety of different ways. A particular example is realized by an implementation of superconducting qubits.

FIG. 1 is a schematic diagram of a portion of an exemplary superconducting quantum processor 100 designed for AQC (and/or quantum annealing) that may be used to implement the present systems and methods. The portion of superconducting quantum processor 100 shown in FIG. 1 includes two superconducting qubits 101, 102 and a tunable ZZ-coupler 111 coupling information therebetween (i.e., providing pair-wise coupling between qubits 101 and 102). While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize adiabatic quantum computing (AQC) and/or quantum annealing (QA) by initializing the system with the Hamiltonian described by equation 2 and evolving the system to the Hamiltonian described by equation 3 in accordance with the evolution described by equation 1. Quantum processor 100 includes a plurality of interfaces 121-125 that are used to configure and control the state of quantum processor 100. Each of interfaces 121-125 may be realized by a respective inductive coupling structure, as illustrated, as part of a programming subsystem and/or an evolution subsystem. Such a programming subsystem and/or evolution subsystem may be separate from quantum processor 100, or it may be included locally (i.e., on-chip with quantum processor 100) as described in, for example, U.S. Pat. No. 7,876,248 and U.S. Pat. No. 8,035,540.

In the operation of quantum processor 100, interfaces 121 and 124 may each be used to couple a flux signal into a respective compound Josephson junction 131, 132 of qubits 101 and 102, thereby realizing the $\Delta_i$ terms in the system Hamiltonian. This coupling provides the off-diagonal $\sigma^x$ terms of the Hamiltonian described by equation 2 and these flux signals are examples of "disordering signals." Similarly, interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of equation 3. Furthermore, interface 125 may be used to couple a flux signal into coupler 111, thereby realizing the $J_{ij}$ term(s) in the system Hamiltonian. This coupling provides the diagonal $\sigma^z_i \sigma^z_j$ terms of equation 3. In FIG. 1, the contribution of each of interfaces 121-125 to the system Hamiltonian is indicated in boxes 121a-125a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 121-125.

Throughout this specification and the appended claims, the term "quantum processor" is used to generally describe a collection of physical qubits (e.g., qubits 101 and 102) and couplers (e.g., coupler 111). The physical qubits 101 and 102 and the couplers 111 are referred to as the "programmable elements" of the quantum processor 100 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 122, 123, and 125) used to apply the programmable parameters (e.g., the $h_i$ and $J_{ij}$ terms) to the programmable elements of the quantum processor 100 and other associated control circuitry and/or instructions. As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" is used to generally describe the interfaces (e.g., "evolution interfaces" 121 and 124) used to evolve the programmable elements of the quantum processor 100 and other associated control circuitry and/or instructions. For example, the evolution subsystem may include annealing signal lines and their corresponding interfaces (121, 124) to the qubits (101, 102).

Quantum processor 100 also includes readout devices 141 and 142, where readout device 141 is configured to read out the state of qubit 101 and readout device 142 is configured to read out the state of qubit 102. In the embodiment shown in FIG. 1, each of readout devices 141 and 142 comprises a respective DC-SQUID that is configured to inductively couple to the corresponding qubit (qubits 101 and 102, respectively). In the context of quantum processor 100, the term "readout subsystem" is used to generally describe the readout devices 141, 142 used to read out the final states of the qubits (e.g., qubits 101 and 102) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication 2012-064974.

While FIG. 1 illustrates only two physical qubits 101, 102, one coupler 111, and two readout devices 141, 142, a quantum processor (e.g., processor 100) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

The various embodiments described herein provide systems and methods for improving the performance of a quantum processor by reducing error and improving the fabrication and design of the quantum processor.

The various embodiments described herein provide systems and methods for interacting with quantum processors. More specifically, the various embodiments described herein provide systems and methods for improving the processor topology, reducing intrinsic/control errors, reducing thermally-assisted errors and encoding of the problems for efficient error correction.

In the various embodiments described herein, a digital computer may be used to interact with a quantum processor. A quantum processor may include a number of programmable elements, and interacting with a quantum processor may include programming the quantum processor with a particular problem formulation and/or configuration of programmable parameters by assigning specific values to these programmable elements. Interacting with a quantum processor may also include evolving the quantum processor (e.g., performing adiabatic quantum computation and/or quantum annealing) to determine a solution to the particular problem and reading out the solution from the quantum processor.

Figure 2:
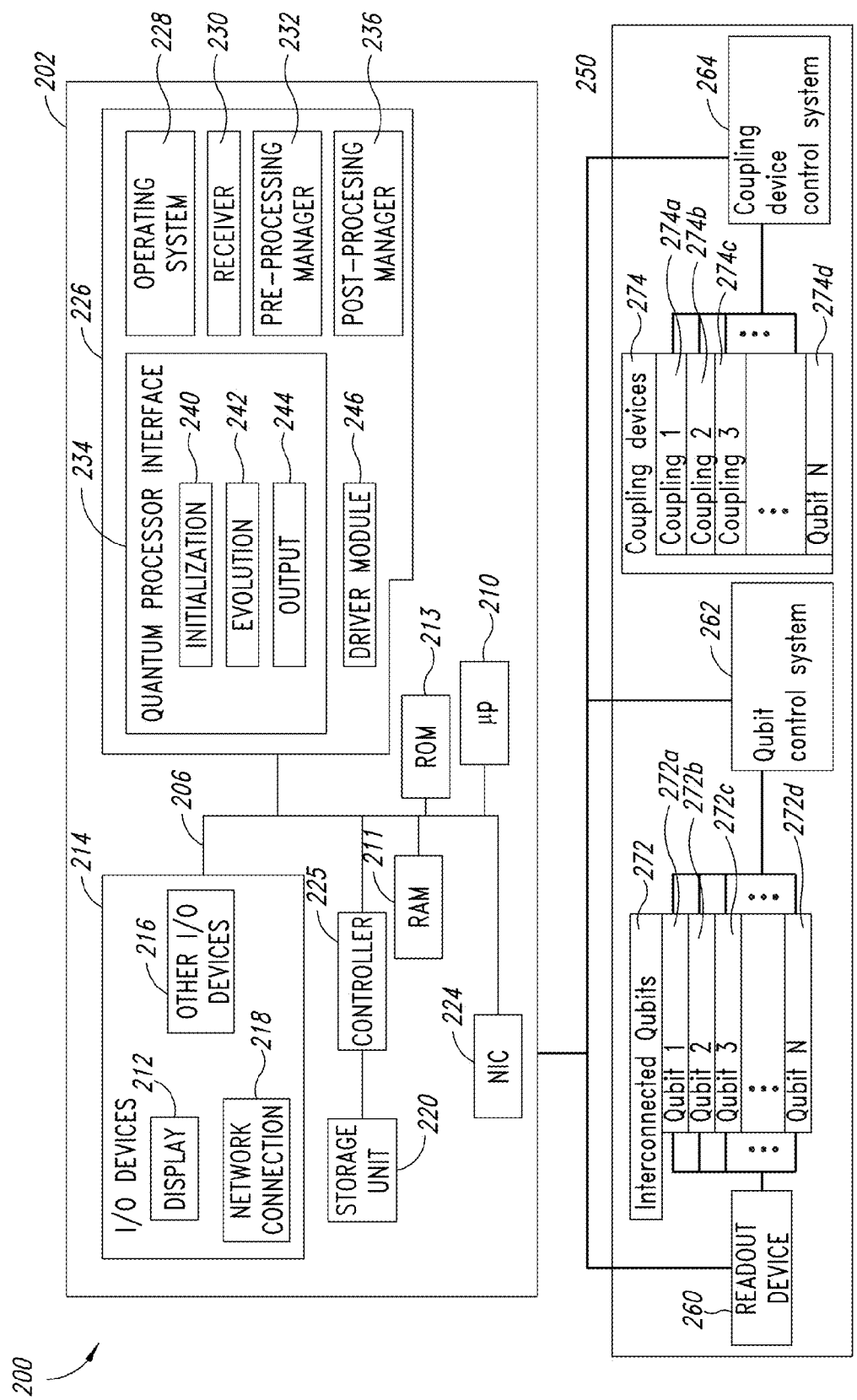
FIG. 2 is a schematic diagram that illustrates an exemplary hybrid computer including a digital processor and an analog processor in accordance with the present methods, systems and devices.

FIG. 2 shows an exemplary hybrid problem-solving system 200. Problem-solving system 200 may include a computer 202 and an analog processor 250. An analog processor is a processor that employs the fundamental properties of a physical system to find the solution to a computation problem. In contrast to a digital processor, which requires an algorithm for finding the solution followed by the execution of each step in the algorithm according to Boolean methods, analog processors do not involve Boolean methods.

Computer 202 may include one or more controllers such as microprocessor 210, non-volatile storage controller 225, digital signal processor (DSP) (not shown), analog processor 250, and the like. Computer 202 may further include one or more memories 226 coupled to controllers 210, 225, 250 by one or more busses 206. Examples of the one or more memories include a system memory 226, such as high speed random-access memory (RAM), for storing system control programs (e.g., operating system 228, application programs loaded from main non-volatile storage unit 220, data, and the like), and a read-only memory (ROM). Computer 202 may also include a main non-volatile storage unit 220, a user interface 214, a network interface card (NIC) 224, communication circuitry, a network connection 218, and the like. NIC 224, communication circuitry, network connection 218 and the like may provide one or more communication paths, for example allowing the system to communicate with one or more external devices (e.g., external computing systems, server computing systems, memories, etc.). User interface 214 may also include one or more input devices 216 including a display 212, a mouse, a keyboard, and other peripheral devices.

Computer 202 may include an operating system 228 for handling various system services, such as file services, and for performing hardware dependent tasks. Examples of operating system 228 include UNIX, Windows NT, Windows XP, DOS, LINUX, VMX, and the like. Alternatively, no operating system 228 may be present and instructions may be executed, for example, in a daisy chain manner. In an embodiment, computer 202 may take the form of a digital computer. In another embodiment, analog processor 250 may be in communication with computer 202.

Analog processor 250 may take the form of quantum processor, including a plurality of qubits 272a-272d (only four called out in figure) forming an interconnected topology, a plurality of coupling devices 274a-274d (only four called out in figure), a readout device 260, a qubit control system 262, and a coupling device control system 264. Quantum processor may include at least two qubits 272a, 272b, at least one coupling device 274a, and at least one local bias device.

Interconnected topology of qubits 272, collectively, serves as the basis for performing quantum computation, and may take the form of superconducting qubits. Examples of qubits include quantum particles, atoms, electrons, photons, ions, and the like. Typical superconducting qubits, for example, have the advantage of scalability and are generally classified depending on the physical properties used to encode information including, for example, charge and phase devices, phase or flux devices, hybrid devices, and the like.

Quantum processor may further include a readout device 260. Readout device 260 may include a plurality of dc-SQUID magnetometers, each inductively connected to a different qubit within interconnected topology 272. NIC 224 may be configured to receive a voltage or current from readout device 260. The dc-SQUID magnetometers including a loop of superconducting material interrupted by at least one Josephson junctions are well known in the art.

Qubit control system 262 may include one or more controllers for interconnected topology of qubits 272. Coupling device control system 264 may include one or more coupling controllers for the coupling devices, collectively 274. Each respective coupling controller in coupling device control system 264 may be configured to tune the coupling strength of a corresponding coupling device 274a-274d from zero to a maximum value. Coupling devices 274 may be tuned, for example, to provide ferromagnetic or anti-ferromagnetic coupling between qubits 272.

Problem-solving system 200 may further include a number of programs and data structures. Typically, some or all of the data structures and programs may be stored in one or more memories including system memory 226, random-access memory 211, read-only memory 213, and the like (i.e., nontransitory computer- or processor-readable media). Such may include storing information regarding at least one of: a coupling state corresponding to at least one of the controllable coupling devices or an initial basis state corresponding to at least one of the quantum devices. Likewise these programs and data structures or information may be processed using one or more microprocessors 210, analog processors 250, and the like. For ease of presenting the various features and advantages of the present systems, devices, and methods, however, such data structures, and programs are drawn as components of system memory 226. It will be appreciated, however, that at any given time the programs and data structures illustrated in system memory 226 or other information (e.g., information regarding at least one of: a coupling state corresponding to at least one of the controllable coupling devices or an initial basis state corresponding to at least one of the quantum devices) may be stored, for example, in non-volatile storage unit 220. In some embodiments, some or all of the data structures and programs may be stored on one or more remote computers not illustrated in FIG. 2, provided that the one or more remote computers are addressable by computer 202, i.e., that there is some communication measure between the remote computer and computer 202 such that data can be exchanged among computers over, for example, a data network (e.g., the Internet, a serial connection, a parallel connection, Ethernet, and the like) using a communication protocol (e.g., FTP, telnet, SSH, IP, and the like). In some other embodiments, some or all of the data structures and programs may be redundantly stored and/or processed on one or more remote computers (not shown), provided that the one or more remote computers are addressable by computer 202. Instructions and/or data may include instructions and/or data for implementing various ones of the techniques taught herein, including error correction or amelioration techniques, for instances those of FIG. 3.

Problem-solving system 200 may further include a receiver 230, a pre-processing manager 232, an analog processor interface 234 such as a quantum processor interface 234, and a post-processing manager 236. Receiver 230 may be configured to receive problems to be solved on the analog processor 250. Receiver 230 may further be configured to send a response to a computational problem processing request.

In an embodiment, receiver 230, pre-processing manager 232, quantum processor interface 234 and post-processing manager 236 are all implemented in one or more digital computing systems. In another embodiment, at least one of receiver 230, pre-processing manager 232, quantum processor interface 234, and post-processing manager 236 may be in a location remote from quantum processor.

Microprocessor 210 may be configured to determine an estimate for producing one or more solutions to the computational problem processing requests based in part on a comparison to problems of like complexity.

Analog processor 250 may be operable to produce one or more solutions to computational problems identified by the computational problem processing requests. In some embodiments, analog processor 250 may be operable to obtain one or more solutions to the computational problems via a physical evolution of the analog processor. In another embodiment, problem-solving system 200 may include additional analog processors 250 operable to redundantly co-process one or more solutions to computational problems identified by the computational problem processing requests.

A computational problem may be received by the problem-solving system 200 via a telephone modem, a wireless modem, a local area network connection, a wide area network connection, a portable digital data device, and the like. The information received by receiver 230 may include initial values of couplings between qubits 272, local bias of qubits 272, run-time control parameters, and the like. Alternatively, the information received by receiver 230 may include a graph that represents a computational problem, macro-language instructions, such as AMPL, that define a computational problem, and the like.

Receiver 230 may be operable to provide instructions for scheduling a computation, as well as acquiring the solution to the problem. In an embodiment, a solution of the computation is collected as an output from quantum processor. In another embodiment, receiver 230 may optionally include a graphical user interface (GUI), Command Line Interfaces (CLI), Text User Interface (TUI), and the like. In another embodiment, receiver 230 is operable to receive graphical representations of the computational problem.

Problem-solving system 200 may further include one or more communications links, such as, for example, a network connection 218, for sending and receiving data among at least two of receiver 230, pre-processing manager 232, quantum processor interface 234, quantum processor, and post-processing manager 236. The communications link may further include an encryption interface (not shown).

Pre-processing manager 232 may be configured to receive the computational problem processing request from receiver 230, and convert the computational problem processing requests into a first series of instructions. Pre-processing manager 232 may further be configured for determining a first Hamiltonian. In an embodiment, pre-processing manager 232 is configured for mapping a computational problem into a problem of an equivalent complexity class. In another embodiment, pre-processing manager 232 includes logic to map the computational problem into at least one of a problem of equivalent, greater or lesser complexity class. In an embodiment, the logic to map the computational problem onto analog processor 250 includes instructions for mapping the computational problem onto a topological representation and embedding the topological representation onto analog processor 250. In an embodiment, the topological representation is in a form of at least one of a planar graph or a non-planar graph. In another embodiment, the topological representation is a graph in the form of a plurality of vertices, and one or more edges. In another embodiment, the topological representation is an interconnected graph of the same structure had by the interconnected topology of qubits.

In another embodiment, pre-processing manager 232 is configured for mapping a computational problem onto analog processor 250, for example, quantum processor. Mapping a computational problem onto analog processor 250 may include, for example, mapping the computational problem onto a graph and embedding the graph onto analog processor 250.

Quantum processor interface 234 may be operable to receive a first series of instructions from pre-processing manager 232. Quantum processor may be configured to receive a second series of instructions from quantum processor interface 234, and obtain a solution to the computational problem processing request by a physical evolution of the analog processor. Post-processing manager 236 may be configured to convert the solution into a post-processed solution.

Pre-processing manager 232 may include a mapper interface configured to map a computational problem to be solved into a corresponding problem description that is solvable by analog processor 250. The mapper interface may be configured to map problems from one graphical representation into a target graphical representation required for a specific configuration of analog processor 250. In an embodiment, the target graphical representation may include an interconnected topology, analog processor 250 may take the form of a quantum processor that may include a lattice of qubits 272 and coupling devices 274, and each coupling device 274 may be configured to couple two qubits 272 together.

The mapper interface may be configured to map some NP problems (e.g., a mathematical problem such as Maximum Independent Set, Max Clique, Max Cut or k-SAT, or a problem such as an integer programming problem, a constraint optimization problem, a factoring problem, a prediction modeling problem, an operations research problem, a financial portfolio selection problem, a scheduling problem, a supply management problem, a circuit design problem, a travel route optimization problem, a business process simulation problem, an ecological habitat simulation problem, a protein folding simulation problem, a molecular ground state simulation problem or a quantum system simulation problem, and the like) into another NP problem, such as the Ising Spin Glass problem or other problems already mentioned.

Once the target graphical representation needed to solve a desired problem has been mapped by the mapper interface, quantum processor interface 234 is used to set up the coupling values and local bias values for coupling devices 274 and interconnected qubits 272 in order to map the representation onto quantum processor. In an embodiment, three discrete program modules may provide the functions of quantum processor interface 234: an initialization module 240, an evolution module 242, and an output module 244.

Initialization module 240 may be configured to determine the appropriate values of coupling $J_{ij}$ for coupling devices 274 and values of local bias $h_i$ for interconnected qubits 272. Initialization module 240 may be configured to convert aspects of a problem definition into physical values, such as coupling strength values and qubit bias values, which can be programmed into quantum processor. Initialization module 240 may then be configured to send the appropriate signals along one or more internal buses 206 into NIC 224. NIC 224, in turn, may be configured to send such commands to qubit control system 262 and coupling device control system 264.

For any given problem, evolution module 242 may be configured to determine the appropriate values, at each point in time for the duration of the computation, of coupling $J_{ij}$ for coupling devices 274 and values of local bias $h_i$ for interconnected qubits 272 to fulfill some predetermined evolution schedule (i.e. the schedule for how the evolution is to take place). Once determined, the appropriate coupling device values and local bias values for an evolution schedule are sent as signals, via one or more buses 206, to NIC 224. NIC 224, in turn, is configured to send such commands to quantum device control system 262 and coupling device control system 264.

The computation of analog processor 250 may be configured to operate as, for example, an adiabatic evolution or an annealing evolution. An adiabatic evolution is the evolution used in adiabatic analog computing, and evolution module 242 may be configured to evolve the state of the analog processor 250 in accordance with the evolution used in adiabatic quantum computation. Annealing is another form of evolution applicable to some analog processors 250, and evolution module 242 may be configured to evolve the state of analog processor 250 in accordance with annealing evolution.

Analog processor 250 (e.g., quantum processor) may be configured to solve a quantum problem based on signals provided by initialization module 240 and evolution module 242. Once the problem has been solved, the solution to the problem may be measured from the states of interconnected qubits 272 by readout device 260. Output module 244 may be configured in conjunction with readout device 260 to read this solution.

System memory 226 may further include a driver module 246 configured to output signals to analog processor 250. NIC 224 may be configured to interface with interconnected qubits 272 and coupling devices 274, either directly or through readout device 260, qubit control system 262, and/or coupling device control system 264. Alternatively, NIC 224 may include software and/or hardware that translates commands from driver module 246 into signals (e.g., voltages, currents) that are directly applied to interconnected qubits 272 and coupling devices 274. In an embodiment, NIC 224 may include software and/or hardware for translating signals (representing a solution to a problem or some other form of feedback) from interconnected qubits 272 and the coupling devices 274 such that output module 244 can interpret them. In some embodiments, initialization module 240, evolution module 242, and/or output module 244 may communicate with driver module 246, rather than directly with NIC 224, to send and receive signals from analog processor 250.

The functionality of NIC 224 can be divided into two classes: data acquisition and control. Different types of chips may be used to handle each discrete functional class. Data acquisition is used to measure physical properties of interconnected qubits 272 after quantum processor has completed a computation. Such data can be measured using any number of customized or commercially available data acquisition micro-controllers including data acquisition cards manufactured by Elan Digital Systems (Fareham, UK) including the AD132, AD136, MF232, MF236, AD142, AD218, CF241 cards, and the like. Alternatively, a single type of microprocessor, such as the Elan D403C or D480C, may handle data acquisition and control. There may be multiple NICs 224 in order to provide sufficient control over interconnected qubits 272 and coupling devices 274 and in order to measure the results of a quantum computation on quantum processor.

Computer 202 may further be configured for receiving a computational problem and transmitting the solution of a computational problem processed by analog processor 250 to another system, such as via a telephone modem, a wireless modem, a local area network (LAN) connection, a wide area network (WAN) connection, a portable digital data device, and the like. Computer 202 may be configured to generate a carrier wave embodying a data signal, with the solution to the computational problem processed by analog processor 250 embedded therein.

Analog processor 250 may be in the form of a superconducting quantum computer, examples of which include qubit registers, readout devices, and ancillary devices. Superconducting quantum computers normally are operated at milliKelvin temperatures and often are operated in a dilution refrigerator. An example of a dilution refrigerator is the Leiden Cryogenics B.V. MNK 126 series (Galgewater No. 21, 2311 VZ Leiden, The Netherlands). All or part of the components of quantum processor may be housed in a dilution refrigerator. For example, qubit control system 262 and coupling device control system 264 may be housed outside a dilution refrigerator with the remaining components of quantum processor being housed inside a dilution refrigerator.

Receiver 230, quantum processor interface 234, and driver module 246, or any combination thereof, may be implemented via existing software packages. Suitable software packages include, for example, MATLAB (The MathWorks, Natick, Mass.), LabVIEW (National Instruments, Austin, Tex.), Maple (Waterloo Maple Inc., Waterloo, Ontario, Canada.), Mathematica (Wolfram Research, Inc., Champaign, Ill.), and the like.

In an embodiment, receiver 230 may be configured to receive a computational problem processing request, and to provide identity information indicative of an entity responsible (e.g., financially responsible) for the received computational problem processing request.

In an embodiment, the present systems, devices, and methods may be implemented as a computer program product that includes a computer program mechanism embedded in a computer readable storage medium. For example, the computer program product may include aspects of the quantum processor interface 234, operating system 228, receiver 230, pre-processing manager 232, post-processing manager 236 and the like. Aspects of the various interfaces, managers, and modules, may be stored on a CD-ROM, DVD, magnetic disk storage product, any other computer readable data or program storage product, and may also be distributed electronically, via the Internet or otherwise, by transmission of a computer data signal (in which the software modules are embedded) embodied in a carrier wave, and the like.

In an embodiment, the problem-solving system 200 may include a microprocessor 210, a receiver 230, a pre-processing manager 236 and a quantum processor interface 234. Receiver 230 may be configured to receive a computational problem processing request and provide identity information indicative of an entity responsible for the received computational problem processing request. Quantum processor interface 234 may be configured to convert the computational problem processing request into a series of instructions receivable by quantum processor, to obtain a solution to the computational problem processing request, and/or to send a solution to the computational problem.

In other embodiments, problem-solving system 200 may include additional processors 210 configured to store execution data including processing variables, solution parameters, simulation trajectories, checkpoints, and the like throughout the processing of a computational problem processing request. For example, by storing execution data at predetermined times or after predetermined acts, it may be possible to return problem-solving system 200 to a predetermined point or checkpoint. Storing the execution data at predetermined times may include, for example, storing the execution data at regular intervals or according to a user-determined schedule.

In an embodiment, in the event that problem-solving system 200 experiences a power loss, and/or an application or the operating system stops performing its expected function and/or portions of an application or the operating system stop responding to other parts of the system, stored processing variables, solution parameters, simulation trajectories, and/or checkpoints, and the like may be used to return problem-solving system 200 to a predetermined point or checkpoint.

Figure 3:
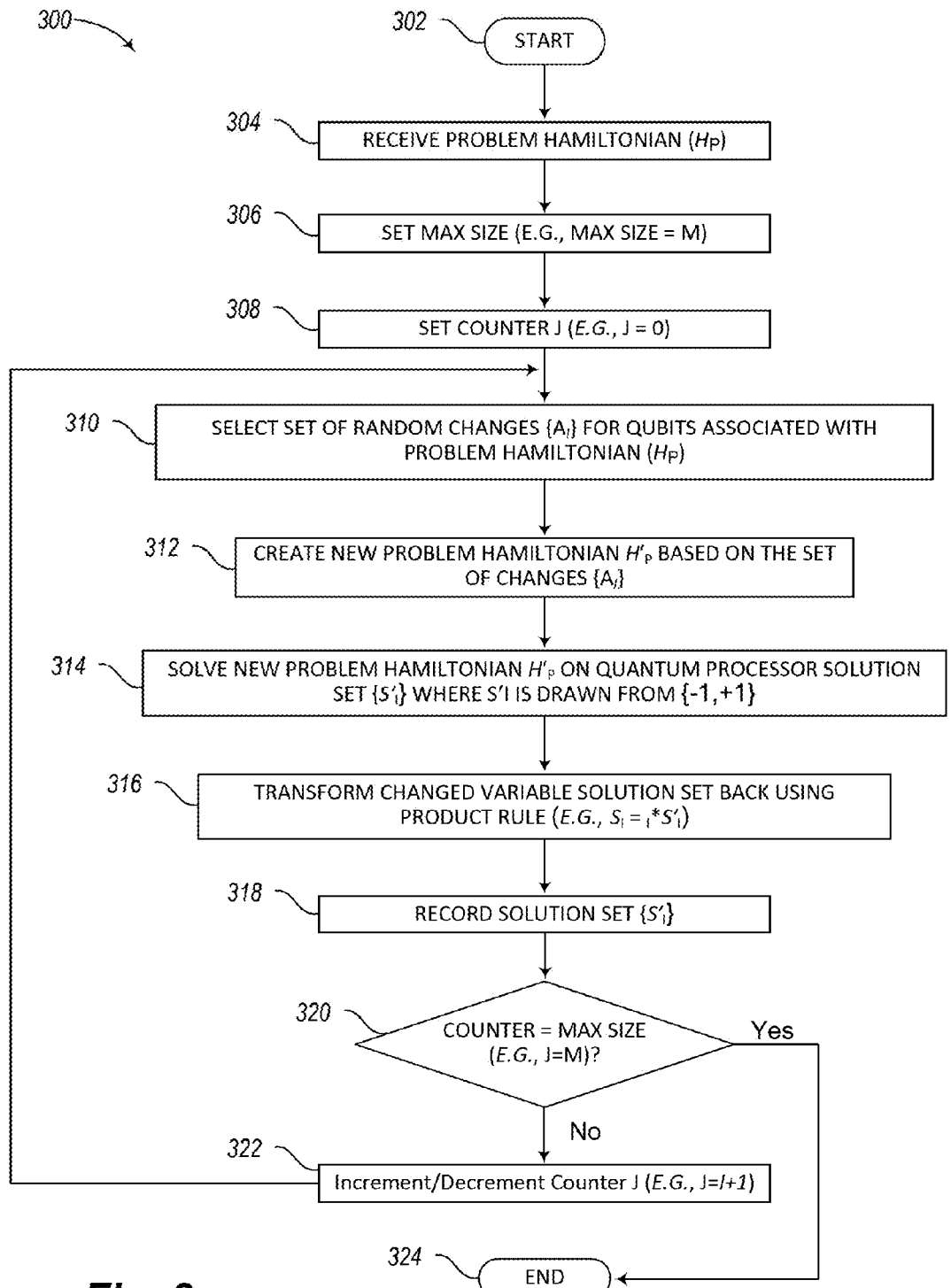
FIG. 3 is a flow diagram showing a method implementing a change of variables on a problem Hamiltonian to increase the performance of a quantum processor in accordance with the present methods, systems and devices.

FIG. 3 is a flow diagram showing a method 300 implementing a change of variables on a problem Hamiltonian to increase the performance of a quantum processor in accordance with the present methods, systems and devices.

Method 300 could be implemented by a series of processor readable instructions stored on a media. Some examples of method 300 are performed in part by a specialized device such as an adiabatic quantum computer or a quantum annealer or a system to program or otherwise control operation of an adiabatic quantum computer or a quantum annealer, for instance a computer that includes at least one digital processor. Method 300 includes various acts, though those of skill in the art will appreciate that in alternative examples certain acts may be omitted and/or additional acts may be added. Those of skill in the art will appreciate that the illustrated order of the acts is shown for exemplary purposes only and may change in alternative examples.

Method 300 starts at 302, for example in response to a call from another routine.

At 304, the system receives a problem Hamiltonian ($H_P$). The problem Hamiltonian includes information defining a plurality of qubits. Examples of the information include an index to the plurality of qubits. An example of a problem Hamiltonian is shown in equation 26. The problem Hamiltonian includes a plurality of parameters. The plurality of parameters specify the problem Hamiltonian. For example, the plurality of parameters include a set of single qubit parameters, such as, the weights on the one qubit diagonal terms in equation 30. As well, in the same and other examples, the plurality of parameters include a set of two qubit parameters, such as, the weights on the two qubits diagonal terms in equation 30.

In some examples, in addition to the problem Hamiltonian the system may receive a positive integer M that sets a limit on the number of iterations which may be performed. In some examples, the integer M is specified by system default, user configuration, and the like. The integer M represents the number of times that a change of variables will be performed in solving the problem Hamiltonian according to the method 300.

At 306, a variable maximum size (Max Size) is set. The variable may be set equal to the received positive integer M. At 308, the system sets a counter J, for example setting the counter J equal to zero.

At 310, the system selects a set of random changes for the qubits associated with the problem Hamiltonian. For example, a digital computer may select a set of values from the domain of $\{-1,+1\}$ over the range of the qubit index.

For instance, if there are 1023 qubits at least 1023 tosses of a fair coin are simulated at values −1 or +1 assigned to each value in the index. The changes, or perturbations may be denoted $\alpha_i = \pm 1$, where the index i is the qubit index and the set of changes denoted $\{\alpha_i\}$. The qubit index is drawn integers from 1 to N. If certain qubits are non-operational the change can be omitted or determined and not used. One method of simulating the tossing of a fair coin is to use the output of random number generator whose domain is divided into "−1" and "+1" portions. In some examples the portions are equal. A random number generator can be built using a pseudo random number generator linked to a random source such as the lower order digits of a real time clock. An example of a pseudo random number generator is a linear congruent random number generator. The system (e.g., computer) saves the set of changes $\{\alpha_i\}$.

At 312, a processor-based component of the system (e.g., computer) creates a new problem Hamiltonian based at least in part on the set of changes $\{\alpha_i\}$. The new problem Hamiltonian, denoted $H'_P$, is for example created using the transformations defined in equations 24 through 26. The local bias, an example of a single qubit diagonal term, for a qubit at a representative index is given the opposite sign if the associated value in the set of changes $\{\alpha_i\}$ is −1. That is the new local bias is product of the change value and the old local bias term for the qubit index. The new coupling value, an example of a two qubit diagonal term, for a pair of qubits at a representative pair of index values is updated to the product of the change associated with first qubit, change associated with the second qubit, and the old coupling value.

At 314, the new problem Hamiltonian is solved on a quantum processor, for example using adiabatic quantum computing or quantum annealing. The result of the computation, a solution set, is received as output from the quantum processor by the computer. The solution includes a plurality of values assigned to the set of qubits. That is, a set $\{s'_i\}$ where $s'_i$ is drawn from $\{-1,+1\}$ and the subscript is the qubit index. This solution set is in a changed variable solution set.

At 316, the changed variable solution set is transformed back using the product rule found in the description of equations 24 through 26. That is, $s_i = \alpha_i * s'_i$.

At 318, the computer records this solution set $\{s_i\}$. In examples of the method 300 where several change of variables are made an index is associated with the solution set. For example, $\{s_i\}_3$ would be the third solution set and $\{s_i\}_m$ is the mth set with m between 1 and M, 0 and M−1, and the like.

At 320, the counter J is checked to determine whether the maximum number of iterations has been reached. If the maximum number of iterations has not been reached, at 322 the counter is incremented (e.g., J=J+1)), or alternatively decremented (e.g., J=J−1), and control returns to 310. If the maximum number of iterations has been reached, the method 300 terminates at 324, for example until invoked again.

Some of the exemplary acts or operations of method 300 are performed iteratively. The number of iterations matches the received or otherwise specified number M. In some examples, an index of maximum size M is decremented or incremented to control the number of iteration in a loop. Examples of the loop include a for-loop, a do-while-loop, and the like. A solution set is associated in each iteration. Some acts of method 300 can be performed during each iteration, after a plurality of iterations, or at the end of all the iterations.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the commonly assigned US patent application publications, US patent applications, foreign patents, and foreign patent applications referred to in this specification and/or listed in the Application Data Sheet, including but not limited to U.S. provisional patent application Ser. No. 61/858,011, filed Jul. 24, 2013 are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hybrid computational system comprising:
at least one quantum processor comprising a plurality of qubits and a plurality of couplers;
a configuration subsystem communicatively coupled to configure the at least one quantum processor, the configuration subsystem including at least one digital processor, and at least one non-transitory computer-readable storage medium communicatively coupled to the at least one digital processor and that stores at least one of processor-executable instructions or data, where in use the at least one digital processor:
receives a problem Hamiltonian defined over at least two of the qubits, the problem Hamiltonian having a ground state that encodes a solution to a computational problem;
during a first iteration on the computational problem:
determines a plurality of change values for the problem Hamiltonian;
updates the problem Hamiltonian to a new problem Hamiltonian using the plurality of change values;
sends the new problem Hamiltonian to the at least one quantum processor;
receives a changed solution set from the at least one quantum processor; and
transforms the changed solution set to a solution set.

2. The hybrid computational system of claim 1 wherein, in use, the at least one digital processor further:
returns the solution set.

3. The hybrid computational of claim 1 wherein, in use, the at least one digital processor selects at random for each entry in the plurality of change values either a change value or a no-change value in order to determine the plurality of change values for the problem Hamiltonian.

4. The hybrid computational of claim 3 wherein the change value is negative, the no-change value is positive, the problem Hamiltonian includes a plurality of local bias terms, the problem Hamiltonian includes a plurality of coupling terms, and, where in use, the at least one digital processor further:
creates a plurality of new local bias terms from the product of the plurality of changes and the plurality of local bias terms; and
creates a plurality of new coupling terms where each new coupling term includes the product of:
a first entry in the plurality of changes,
a second entry in the plurality of changes, and
a first entry in the plurality of coupling terms that correspond to both the first entry in the plurality of changes and the second entry in plurality of changes.

5. The hybrid computational of claim 1 wherein, in use, the at least one quantum processor-performs quantum annealing or adiabatic quantum computing.

6. The hybrid computational of claim 1 wherein, in use, the at least one digital processor creates a plurality of new qubit values from the product of the plurality of changes and the changed solution set in order to transform the changed solution set to the solution set.

7. The hybrid computational of claim 1 wherein, in use, the at least one digital processor further receives an integer M.

8. The hybrid computational of claim 7 wherein, in use, the at least one digital processor further:
during an $M^{th}$ iteration on the computational problem:
determines an $M^{th}$ plurality of change values for the problem Hamiltonian;
updates the problem Hamiltonian to a new $M^{th}$ problem Hamiltonian using the $M^{th}$ plurality of change values;
sends the new $M^{th}$ problem Hamiltonian to the at least one quantum processor;
receives an $M^{th}$ changed solution set from the at least one quantum processor; and
transforms the $M^{th}$ changed solution set to an $M^{th}$ solution set.

9. The hybrid computational of claim 8 wherein, in use, the at least one processor further:
during the $M^{th}$ iteration on the computational problem:
records the $M^{th}$ plurality of change values; and
records the $M^{th}$ solution set.

10. A method to configure at least one quantum processor which comprises a plurality of qubits and a plurality of couplers, the method comprising:
a configuration subsystem communicatively coupled to configure the at least one quantum processor, the configuration subsystem including at least one digital processor, and at least one non-transitory computer-readable storage medium communicatively coupled to the at least one digital processor and that stores at least one of processor-executable instructions or data, where in use the at least one digital processor:
receiving, via at least one digital processor, a problem Hamiltonian defined over at least two of the qubits, the problem Hamiltonian having a ground state that encodes a solution to a computational problem;
during a first iteration on the computational problem:
determining, via at least one digital processor, a plurality of change values for the problem Hamiltonian;
updating, via at least one digital processor, the problem Hamiltonian to a new problem Hamiltonian using the plurality of change values;
sending the new problem Hamiltonian to the at least one quantum processor;

receiving, via at least one digital processor, a changed solution set from the at least one quantum processor; and transforming, via at least one digital processor, the changed solution set to a solution set.

11. The method of claim 10, further comprising:
returning the solution set.

12. The method of claim 10 wherein determining the plurality of change values for the problem Hamiltonian includes selecting at random for each entry in the plurality of change values either a change value or a no-change value.

13. The method of claim 12 wherein the change value is negative, the no-change value is positive, the problem Hamiltonian includes a plurality of local bias terms, the problem Hamiltonian includes a plurality of coupling terms, and, further comprising:

creating a plurality of new local bias terms from the product of the plurality of changes and the plurality of local bias terms; and creating a plurality of new coupling terms where each new coupling term includes the product of:
a first entry in the plurality of changes,
a second entry in the plurality of changes, and
a first entry in the plurality of coupling terms that correspond to both the first entry in the plurality of changes and the second entry in plurality of changes.

14. The method of claim 10 wherein transforming the changed solution set to the solution set includes creating a plurality of new qubit values from the product of the plurality of changes and the changed solution set.

15. The method of claim 10, further comprising:
receiving, via the at least one digital processor, an integer M.

16. The method of claim 15, further comprising:
during an $M^{th}$ iteration on the computational problem:
determining, via the at least one digital processor, an $M^{th}$ plurality of change values for the problem Hamiltonian;

updating, via the at least one digital processor, the problem Hamiltonian to a new $M^{th}$ problem Hamiltonian using the $M^{th}$ plurality of change values;

sending the new $M^{th}$ problem Hamiltonian to the at least one quantum processor;

receiving an $M^{th}$ changed solution set from the at least one quantum processor; and transforming the $M^{th}$ changed solution set to an $M^{th}$ solution set.

17. The method of claim 16, further comprising:
during the $M^{th}$ iteration on the computational problem:
recording the $M^{th}$ plurality of change values; and
recording the $M^{th}$ solution set.

18. A non-transitory computer-readable storage medium containing processor-executable instructions, which when executed cause at least one processor to:
receive a problem Hamiltonian defined over a plurality of qubits wherein the problem Hamiltonian has a ground state that encodes a solution to a computational problem;
during a first iteration on the computational problem:
determine a plurality of change values for the problem Hamiltonian;

update the problem Hamiltonian to a new problem Hamiltonian using the plurality of change values;
send the new problem Hamiltonian to a quantum processor;
receive a changed solution set from the quantum processor; and
transform the changed solution set to a solution set.

19. The computer-readable storage medium of claim 18 wherein the processor-executable instructions when executed further cause the at least one processor to:
return the solution set.

20. The computer-readable storage medium of claim 18 wherein the processor-executable instructions to determine the plurality of change values for the problem Hamiltonian when executed further cause the at least one processor to:
select at random for each entry in the plurality of change values either a change value or a no-change value.

21. The computer-readable storage medium of claim 20 wherein the change value is negative, the no-change value is positive, the problem Hamiltonian includes a plurality of local bias terms, the problem Hamiltonian includes a plurality of coupling terms, and the processor-executable instructions when executed further cause the at least one processor to:
create a plurality of new local bias terms from the product of the plurality of changes and the plurality of local bias terms; and
create a plurality of new coupling terms where each new coupling term includes the product of:
a first entry in the plurality of changes,
a second entry in the plurality of changes, and
a first entry in the plurality of coupling terms corresponding to both the first entry in the plurality of changes and the second entry in plurality of changes.

22. The computer-readable storage medium of claim 18 wherein the processor-executable instructions to transform the changed solution set to the solution set when executed further cause the at least one processor to:
create a plurality of new qubit values from the product of the plurality of changes and the changed solution set.

23. The computer-readable storage medium of claim 18 wherein the processor-executable instructions when executed further cause the at least one processor to:
receive an integer, M; and
during an $M_{th}$ iteration on the computational problem:
determine an $M_{th}$ plurality of change values for the problem Hamiltonian;
update the problem Hamiltonian to a new $M_{th}$ problem Hamiltonian using the $M_{th}$ plurality of change values;
send the new $M_{th}$ problem Hamiltonian to a quantum processor;
receive an $M_{th}$ changed solution set from the quantum processor;
transform the $M_{th}$ changed solution set to an $M_{th}$ solution set;
record the $M_{th}$ plurality of change values; and
record the $M_{th}$ solution set.

* * * * *